US012810508B2

(12) United States Patent
Cundall et al.

(10) Patent No.: US 12,810,508 B2
(45) Date of Patent: Nov. 24, 2026

(54) MULTISTAGE SEARCH AND RESULTS UTILIZING PRESTORED IMAGE ASSETS AND ADAPTIVE CACHING TO MINIMIZE MACHINE LEARNING AND ARTIFICIAL INTELLIGENCE DATA AND ENERGY COSTS

(71) Applicant: Microsoft Technology Licensing, LLC, Redmond, WA (US)

(72) Inventors: Samuel Robert Cundall, Mercer Island, WA (US); Zachary William Moore, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 75 days.

(21) Appl. No.: 18/967,084

(22) Filed: Dec. 3, 2024

(65) Prior Publication Data

US 2026/0154875 A1 Jun. 4, 2026

(51) Int. Cl.
*G06T 11/60* (2026.01)
*G06F 16/532* (2019.01)
(Continued)

(52) U.S. Cl.
CPC ............ *G06T 11/60* (2013.01); *G06F 16/532* (2019.01); *G06F 40/242* (2020.01); *G06F 40/284* (2020.01); *G06F 40/40* (2020.01)

(58) Field of Classification Search
None
See application file for complete search history.

(56) References Cited

U.S. PATENT DOCUMENTS 11,809,688 B1 * 11/2023 Parasnis .............. G06F 3/04812
2022/0414396 A1 * 12/2022 Jaiswal ................. G06F 18/214
(Continued)

FOREIGN PATENT DOCUMENTS

WO 2025207352 A1 10/2025

OTHER PUBLICATIONS

Koh, Jing Yu, Daniel Fried, and Russ R. Salakhutdinov. "Generating images with multimodal language models." Advances in Neural Information Processing Systems 36 (2023): 21487-21506. (Year: 2023).*
(Continued)

*Primary Examiner* — Tapas Mazumder
(74) *Attorney, Agent, or Firm* — Novo TechIP International PLLC

(57) ABSTRACT

A data processing system implements an image generation system configured to operate in a first generation mode providing requested image contents based on prestored image assets without using an AI model to generate the requested image contents, a second generation mode generating the requested image contents using the AI model; and a hybrid mode, receiving a first textual prompt first image content; analyzing the first textual prompt, evaluating whether the image generation system includes prestored image content in the image asset repository that satisfies the first textual prompt, and responsive to determining that the image generation system lacks at least one of prestored image content in the image asset repository that satisfies at least one image element of the first image content requested by the first textual prompt, operating the image generation system in the hybrid generation mode to generate the first image content.

20 Claims, 20 Drawing Sheets

(51) Int. Cl.

| | |
|---|---|
| ***G06F 40/242*** | (2020.01) |
| ***G06F 40/284*** | (2020.01) |
| ***G06F 40/40*** | (2020.01) |

(56) References Cited

U.S. PATENT DOCUMENTS

| | | | | |
|---|---|---|---|---|
| 2024/0127511 | A1 | 4/2024 | Brdiczka | |
| 2026/0064983 | A1 | 3/2026 | Thompson | |
| 2026/0089128 | A1 * | 3/2026 | Pathak | H04L 51/10 |
| 2026/0154874 | A1 | 6/2026 | Cundall | |

OTHER PUBLICATIONS

International Search Report and Written Opinion received for PCT Application No. PCT/US2025/043825, mailed on Mar. 20, 2026, 14 pages.
Notice of Allowance mailed on May 27, 2026, in U.S. Appl. No. 18/966,948, 11 Pages.
Koh, et al., "Generating Images with Multimodal Language Models", In repository of arXiv:2305.17216v3, Oct. 13, 2023, pp. 1-20.
International Search Report and Written Opinion received for PCT Application No. PCT/US2025/043824, mailed on Feb. 6, 2026, 14 pages.
"Gradio-Build & share delightful machine learning apps", Retrieved from: https://www.gradio.app/, Retrieved on: Jul. 8, 2025, 05 Pages.
Guruprakash, Bharat, "How neural hashing can unleash the full potential of AI retrieval", Retrieved from: https://www.algolia.com/blog/ai/neural-hashing-ai-search-retrieval, Jul. 25, 2024, 13 Pages.
Non-Final Office Action mailed on Sep. 21, 2026, in U.S. Appl. No. 18/966,948, 19 pages.

* cited by examiner

| Character | Horse | Snake | Deer |
|---|---|---|---|
| Legs | | | X |
| Body | | X | |
| Head | X | | |
| Ears | | | X |
| Eyes | X | | |
| Tail | | | X |

Sample Prompt: 1010 create me a poster for a dog party on Wednesday 3rd September from 5pm to 7pm in Seattle, called "Dog Fun"!"

Sample Image Output by Generative AI Model:

1015

Sample Prompt: 1020 create me an image of a dog with more than 4 legs, less than 2 eyes, an ear, tails, noses, several tongues

Sample Image Output by Generative AI Model:

1025

Sample Prompt: 1030

Retain the previous image and remove the snake head and snake tongue from the previous image

Sample Image Output by Generative AI Model: 1035

MULTISTAGE SEARCH AND RESULTS UTILIZING PRESTORED IMAGE ASSETS AND ADAPTIVE CACHING TO MINIMIZE MACHINE LEARNING AND ARTIFICIAL INTELLIGENCE DATA AND ENERGY COSTS

BACKGROUND

Artificial intelligence models have been developed to generate a wide variety of content, including but not limited to image contents. Typically, these models are implemented in a cloud-based computing environment that dedicates a significant amount of computing resources to operating these models, and the data centers that operate these computing resources to support the artificial intelligence models can consume a significant amount of energy and water. As the use of these artificial models has continued to increase, the costs for implementing and operating these models have a significant impact on the enterprise providing these models. Hence, there is a need for improved systems and methods that provide a technical solution for reducing the computational and energy requirements for searching for and generating image contents.

SUMMARY

An example data processing system according to the disclosure includes a processor and a memory storing executable instructions. The instructions when executed cause the processor alone or in combination with other processors to perform operations including providing an image generation system configured to operate in a hybrid generation mode, the hybrid generation mode being a combination of a first generation mode and a second generation mode, the first generation mode providing requested image contents based on prestored image assets from an image asset repository that organizes and stores image assets, and the second generation mode generating the requested image contents by an artificial intelligence model; receiving a first textual prompt from a client device requesting first image content; analyzing the first textual prompt to determine that the first image content includes multiple image elements; evaluating whether the image generation system includes prestored image content in the image asset repository that satisfies the first textual prompt, the image asset repository organizing and storing image assets; based on a result of the evaluating, determining whether the image generation system includes prestored image content in the image asset repository that satisfies less than all image elements required for the first image content satisfying the first textual prompt; responsive to determining that the image generation system satisfies less than all the image elements for the first image content, operating the image generation system in the hybrid generation mode to generate the first image content using the prestored image assets stored in the image asset repository to generate a first portion of the first image content and using the artificial intelligence model to generate a second portion of the first image content, wherein the second portion corresponds to at least one second image element of the first image content that the image asset repository does not have a corresponding prestored image content; automatically constructing the first image content based on the first portion and the second portion; and providing the constructed first image content to the client device.

An example method implemented in a data processing system includes providing an image generation system configured to operate in a hybrid generation mode, the hybrid generation mode being a combination of a first generation mode and a second generation mode, the first generation mode providing requested image contents based on prestored image assets from an image asset repository that organizes and stores image assets, and the second generation mode generating the requested image contents by an artificial intelligence model; receiving a first textual prompt from a client device requesting first image content; analyzing the first textual prompt to determine that the first image content includes multiple image elements; evaluating whether the image generation system includes prestored image content in the image asset repository that satisfies the first textual prompt, the image asset repository organizing and storing image assets; based on a result of the evaluating, determining whether the image generation system includes prestored image content in the image asset repository that satisfies less than all image elements required for the first image content satisfying the first textual prompt; responsive to determining that the image generation system satisfies less than all the image elements for the first image content, operating the image generation system in the hybrid generation mode to generate the first image content using the prestored image assets stored in the image asset repository to generate a first portion of the first image content and using the artificial intelligence model to generate a second portion of the first image content, wherein the second portion corresponds to at least one second image element of the first image content that the image asset repository does not have a corresponding prestored image content; automatically constructing the first image content based on the first portion and the second portion; and providing the constructed first image content to the client device.

An example machine-readable medium on which are stored instructions that, when executed, cause a processor of alone or in combination with other processors to perform operations of providing an image generation system configured to operate in a hybrid generation mode, the hybrid generation mode being a combination of a first generation mode and a second generation mode, the first generation mode providing requested image contents based on prestored image assets from an image asset repository that organizes and stores image assets, and the second generation mode generating the requested image contents by an artificial intelligence model; receiving a first textual prompt from a client device requesting first image content; analyzing the first textual prompt to determine that the first image content includes multiple image elements; evaluating whether the image generation system includes prestored image content in the image asset repository that satisfies the first textual prompt, the image asset repository organizing and storing image assets; based on a result of the evaluating, determining whether the image generation system includes prestored image content in the image asset repository that satisfies less than all image elements required for the first image content satisfying the first textual prompt; responsive to determining that the image generation system satisfies less than all the image elements for the first image content, operating the image generation system in the hybrid generation mode to generate the first image content using the prestored image assets stored in the image asset repository to generate a first portion of the first image content and using the artificial intelligence model to generate a second portion of the first image content, wherein the second portion corresponds to at least one second image element of the first image content that the image asset repository does not have a corresponding prestored image content; automatically constructing the first image content based on the first portion and the second portion; and providing the constructed first image content to the client device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1A:
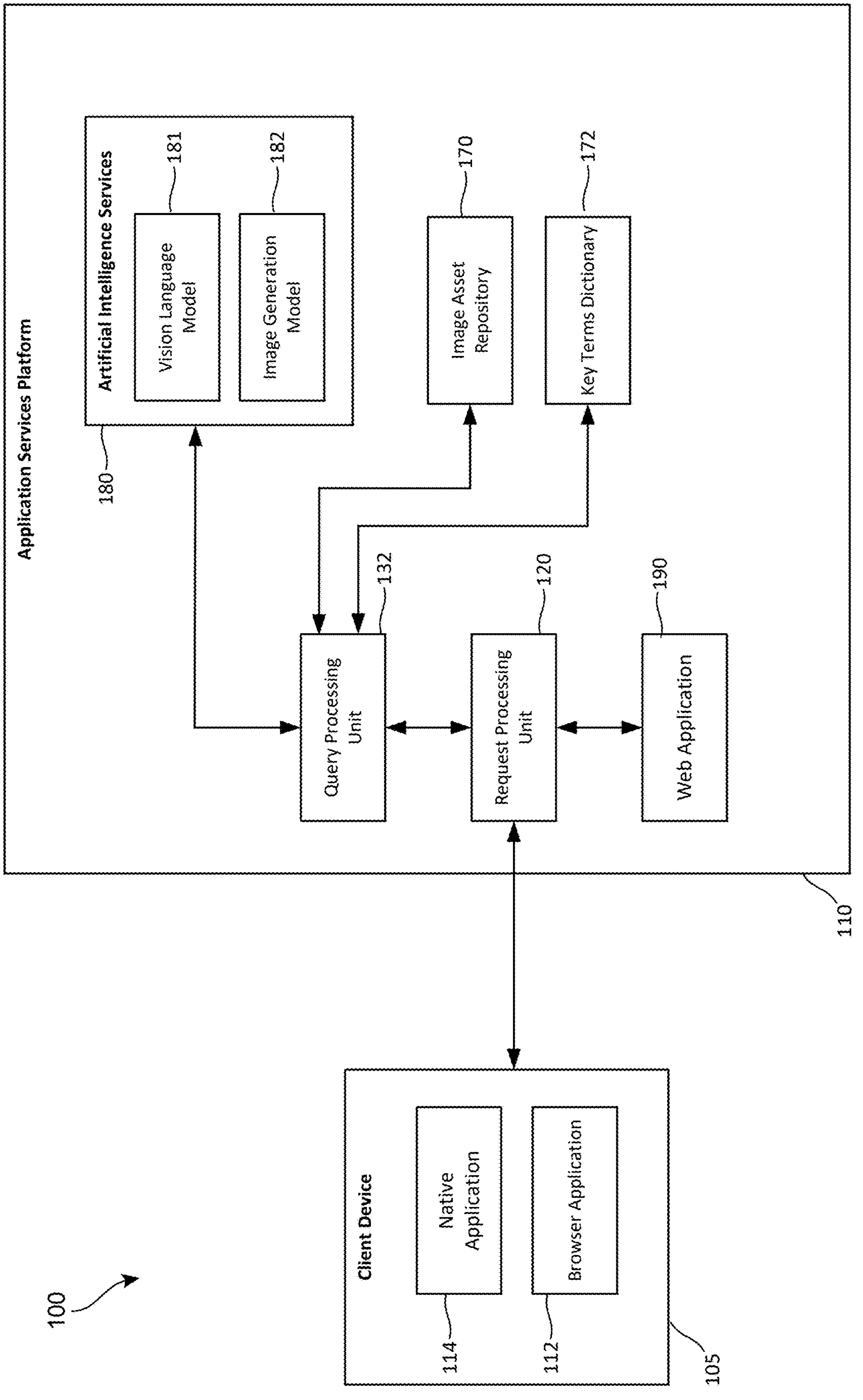
FIG. 1A is a diagram of an example computing environment in which the techniques for providing content in response to user prompts described herein are implemented.

Systems and methods for providing an image generation system that supports searching for and generating image assets in response to user prompts are provided. These techniques provide a technical solution for reducing the computational and energy costs associated with generating image contents in response to a user prompt by utilizing prestored image assets stored in an image asset repository to generate requested image contents. The use of artificial intelligence (AI) models to generate requested image contents is limited to instance in which the image asset repository does not include image assets that can be used to satisfy the user prompt. The image asset repository includes prestored image assets that can be combined into various combinations to create new image assets and/or the prestored image assets can be customized using techniques that do not rely on AI models to customize the prestored image assets. The image generation system makes limited use of AI models to generate requested image contents where the image asset repository does not include any image assets that can satisfy a user prompt. The image generation system can also be configured to operate in a hybrid generation mode in which image assets from the image asset repository are combined with AI generated image assets to generate requested content. The image assets generated in full or in part by the AI model can be added to the image asset repository so that these image assets can be used to fulfill future requests for similar content, thereby reducing future computational and energy costs associated with fulfilling requests for image contents. A technical benefit of this approach is that the computational, energy, and water costs associated with providing an image generation system can be significantly reduced while providing an image generation system that can provide flexible and customized content in response to user prompts. The image generation system can also be used as an image caching system that stores the image assets generated in response to user prompts to prompt reuse of the previously generated image assets. A technical benefit of this approach is that it facilitates faster retrieval of requested image content in the future and avoids the need to generate duplicate image content in response to subsequent user prompts.

Another technical benefit of the image generation system utilizing the hybrid generation model is that the image generation system will first reference image assets in the image asset repository, which contains image assets that have already been curated, vetted, and otherwise proven to be desirable for servicing user requests. This approach provides a significant efficiency gain by relying primarily on the image asset repository, a known source of good image content, which substantially reduces the need for additional checks on quality and appropriateness of the images generated at runtime. Consequently, this allows the image generation system to require fewer software updates, to operate on less complex code, and otherwise operate in a less computationally intensive manner. Known problems related to generative models that include potentially returning unexpected or inappropriate results are mitigated under this technical solution.

Another technical benefit of operating the image generation system in the hybrid operating mode is that the image generation system will first reference the image asset repository to obtain the primary desired aspects of the requested image content, while only relying on a generative AI model for a smaller portion of the requested image content. Consequently, this results in a dramatically fewer number of queries to the generative AI model than would otherwise be required to generate similar requested image content using the generative AI model. This results in substantially improved computational efficiency at run time due to the reduced role of the AI model in generating the request image content.

Additional technical benefits of the operating the image generation system in the hybrid generation mode include improved quality results and faster image creation that purely AI-based systems. Retrieving and modifying prestored images from the image asset repository is much faster than relying on a generative AI model to generate the image content in response to each user prompt. Utilizing the AI model to generate image content in response to each user prompt can introduce a significant amount of latency in responding to user prompts, which can negatively impact the user experience. The image generation system also enables fine-tuning of the previously generated image content enabling an iterative design process in which the user can prompt the image generation system to make changes to the previously generated image content. In contrast, AI models typically generate image content in response to subsequent prompts and do not simply modify the previously generated content. Consequently, the user workflow may be significantly impacted if the content generated by the AI model needs to be further refined, because the subsequently generated image content may not resemble that which was previously generated by the AI model and any details that the user was happy with will also be lost and the user must start over with new images. Not only does this approach interrupt the user workflow, but it also consumes significant computing and other resources to regenerate the images using the AI model for each subsequent change requested by the user. Another technical benefit of the hybrid image generation system provided herein that that image generation system can add text to the image content that accurately reflects the user intent expressed in the textual prompt. AI models struggle creating textual content and often include nonsensical text and/or errors in spelling and accuracy of the textual content. The image generation system provided herein does not rely on the AI models to generate text and avoids these problems. Yet another technical benefit of the image generation system provided herein is that the image generation system provides a better understanding of the semantics of the textual prompt input by the user. AI models lack this semantic understanding and often include unnecessary items in the generated image content and often forget key elements requested in the textual prompt. Thus, the resulting images are unsuitable for use by the user and often result in the user submitting multiple prompts to attempt to obtain usage image content. The image generation system of the present application overcomes these shortcomings by analyzing the textual prompt using a fixed dictionary of key terms that are mapped to images in the image asset repository and other such techniques to generate image assets that better represent the semantics of the textual prompt. These and other technical benefits of the techniques disclosed herein will be evident from the discussion of the example implementations that follow.

FIG. 1A is a diagram of an example computing environment 100 in which the techniques described herein are implemented. The example computing environment 100 includes a client device 105 and an application services platform 110. The application services platform 110 provides one or more cloud-based applications and/or provides services to support one or more web-enabled native applications on the client device 105. These applications may include but are not limited to design applications, communications platforms, visualization tools, and collaboration tools for collaboratively creating visual representations of information, and other applications for consuming and/or creating electronic content. The client device 105 and the application services platform 110 communicate with each other over a network (not shown). The network may be a combination of one or more public and/or private networks and may be implemented at least in part by the Internet.

The application services platform 110 implements an image generation system that can operate in a first generation mode, a second generation mode, and a third generation mode. When operating in the first image generation mode, the image generation system provides requested image contents based on prestored image assets from the image asset repository 170 without using an AI model, such as the image generation model 182. The image generation system can combine multiple image assets from the image asset repository 170 and/or customize the image assets as discussed in the examples which follow. When operating in the second image generation mode, the image generation system generates the requested image content using an AI model, such as the image generation model 182. When operating in the third generation mode (also referred to herein as the hybrid generation mode), the image generation system operates in a hybrid of the first and second operating modes and combines assets from the image asset repository 170 with image assets that have been generated using an AI model. The image generation system can use the textual prompts input by the user, internet search, and/or other techniques to determine appropriate key terms and a description to the newly created image assets. Consequently, subsequent user prompts for similar content can utilize these images assets, thereby reducing the time, power, water, and/or other resources associated with generating the image content while also improving the quality and consistency of the image content generated.

The request processing unit 120 receives requests from an application implemented by the native application 114 of the client device 105 and/or the web application 190 of the application services platform 110. The native application 114 and/or the web application 190 provide a user interface that enables users to input natural language prompts requesting that image content be generated by the application services platform 110. For instance, the user can input a textual prompt to generate image content in a user interface of the native application 114 of the client device 105 or a user interface of the web application 190 being accessed via the browser application 112 of the client device. The prompt can be a natural language prompt that describes the image content being requested from the image generation system or can be a structured query that is input in a query language. The prompt is received by the request processing unit 120, and the request processing unit 120 provides the prompt to the query processing unit 132 for processing. The request processing unit 120 also coordinates communication and exchange of data among components of the application services platform 110 as discussed in the examples which follow.

The query processing unit 132 selectively operates the image generation system in the first generation mode, the second generation mode, or the third generation mode to provide image contents in response to a request for image contents included in a textual prompt input by the user. The query processing unit 132 analyzes the textual prompt received from the native application 114 and/or the web application 190, evaluates whether the image generation system includes prestored image content in the image asset repository 170 that satisfies the first textual prompt, and determines whether the image generation system includes prestored image content in the image asset repository 170 that satisfies less than all image elements required for the first image content satisfying the first textual prompt based on the results of the evaluating. In response to determining that the image generation system includes prestored image content that satisfies the requested image content, the image generation system operates in the first generation mode and produces the requested content based on the prestored image content in the image asset repository 170. In response to determining that the image generation system lacks at least one of prestored image content in the image asset repository that satisfies at least one image element of the requested image content, the query processing unit 132 operates the image generation system in the hybrid generation mode to generate the requested image content using the prestored image assets stored in the image asset repository to generate a first portion of the requested image content and using an AI model to generate a second portion of the requested image content. These first and second portions of the image content are then combined by the image generation system to produce the requested image content. A technical benefit of this approach is that the computational, energy, and water costs associated with providing an image generation system can be significantly reduced when operating the image generation system in the first generation mode and/or the hybrid generation model by utilizing prestored image assets to generate all or part of the requested image content. The image asset repository 170 is a persistent data store in a memory of the application services platform 110 that organizes and stores image assets. These image assets can be combined and/or customized to satisfy the request for image content specified by the textual prompts as discussed in greater detail in the example implementations which follow. The query processing unit 132 operates the image generation system in the second generation mode and utilizes an AI model, such as the image generation model 182, to generate the requested image contents, in response to determining that the image asset repository 170 does not include one or more image assets that satisfy the request for image contents. The examples which follow provide additional details of how the requested image content can be generated using the first generation mode, the second generation mode, and the third generation mode.

The AI services 180 provide various machine learning models that analyze and/or generate content. The AI services 180 includes an image generation model 182 and a vision language model 181 in the implementation shown in FIG. 1A. Some instances of the AI services 180 include other types of AI models, which may include but are not limited to models configured to generate textual content, image content, video content, and/or other types of content in response to a natural language prompt. The image generation model 182 and/or the vision language model 181 are implemented using a Large Language Model (LLM) in some implementations. LLMs are artificial neural networks that are characterized by the size of the model. For instance, an LLM may include a billion or even a trillion weights. Training and executing such models requires significant computing resources and can consume significant amounts of energy. A technical benefit of the image generation system described herein is that usage of the AI models is limited, as discussed in the example implementations which follow, and the image generation system relies on prestored images in the image asset repository 170 whenever possible to reduce the computational and energy requirements for generating images in response to a user prompt. Retrieving prestored images from the image asset repository 170 and customizing these prestored image assets is significantly less computationally and energy intensive than training and hosting AI models to generate requested image contents.

The image generation model 182 is an AI model that is trained to generate image contents in response to a textual prompt. A generative model, as used herein, is an AI model that is capable of generating new data based on a prompt, such as but limited to image content. The image generation model 182 can be implemented using various model architectures. For instance, the image generation model 182 can be implemented by a Generative Pre-Trained Transformer (GPT) language model in some implementations. Other types of AI models that are capable of generating image content in response to a textual prompt can be utilized in other implementations. The image generation model 182 is a multimodal model in some implementation that can receive inputs having more than one modality. For instance, the image generation model 182 can be implemented by a multimodal model that is capable of receiving both a textual prompt and an image prompt and/or capable of outputting image contents that can also textual elements. In such implementations, the textual prompt can provide instructions to the image generation model 182 to generate specified image contents, and the image prompt can provide additional content to the image generation to guide the model in generating when generating the specified image contents. For example, the image prompt can provide color information and/or color palette information to be used in the generated image, stylistic information for guiding the image generation model to generate a specific style of image, and/or other such contextual information that can be used by the image generation model to generate image contents in response to the textual prompt. Multi-modal version of the image generation model 182 is implemented using GPT-4o in some implementations. However, the image generation model 182, whether multimodal or non-multimodal, is not limited to a specific model architecture. Other model architectures capable of generating image contents in response to textual prompts can be utilized to implement the image generation model 182.

The vision language model 181 is an AI model that is trained to analyze an image input and to output a description of the image. In one implementation, the vision language model 181 is a multimodal model that receives a textual prompt input and an image input. The textual input instructs the vision language model 181 to generate a description of an image provided as the image prompt. Some implementations of the vision language model 181 can be implemented using a GPT-4 Vision (GPT-4V) model. Other AI model architectures capable of analyzing an image and outputting a description of the image can be utilized to implement the vision language model 181.

The client device 105 is a computing device that may be implemented as a portable electronic device, such as a mobile phone, a tablet computer, a laptop computer, a portable digital assistant device, a portable game console, and/or other such devices in some implementations. The client device 105 may also be implemented in computing devices having other form factors, such as a desktop computer, vehicle onboard computing system, a kiosk, a point-of-sale system, a video game console, and/or other types of computing devices in other implementations. While the example implementation illustrated in FIG. 1A includes a single client device, other implementations may include a different number of client devices that utilize services provided by the application services platform 110.

The client device 105 includes a native application 114 and a browser application 112. The native application 114 is a web-enabled native application, in some implementations, that enables users to view, create, and/or modify electronic content. The web-enabled native application utilizes services provided by the application services platform 110 including but not limited to creating, viewing, and/or modifying various types of electronic content. The web-enabled native application 114 can utilize the application services platform 110 to generate image contents in response to user prompts. In other implementations, the browser application 112 is used for accessing and viewing web-based content provided by the application services platform 110. In such implementations, the application services platform 110 implements one or more web applications, such as the web application 190, that enables users to view, create, and/or modify electronic content. The application services platform 110 supports both web-enabled native applications and a web application in some implementations, and the users may choose which approach best suits their needs.

Figure 1B:
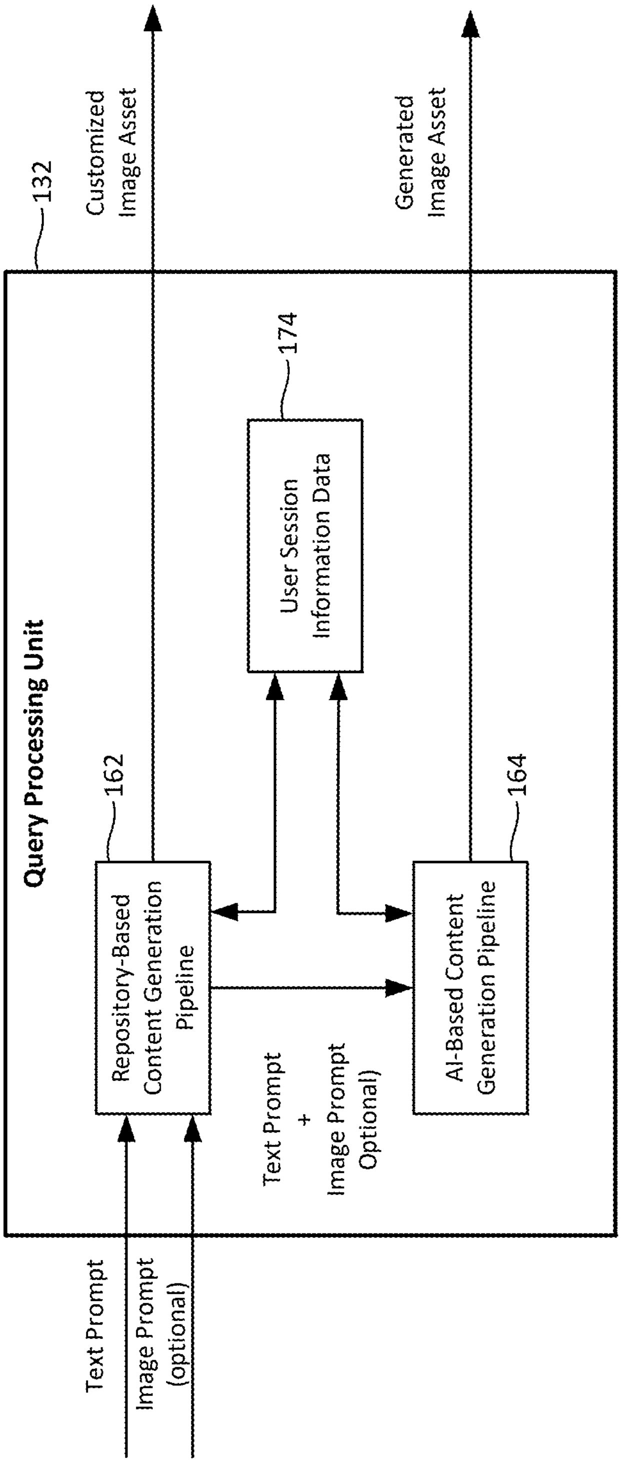
FIG. 1B is a diagram showing an example implementation of the query processing unit shown in FIG. 1A.

FIG. 1B is a diagram showing an example implementation of the query processing unit 132 shown in FIG. 1A. The query processing unit 132 receives as an input, a textual prompt input by a user that instructs the image generation system to generate requested image content. The user prompt can optionally include an image prompt in addition to the textual prompt. The image prompt can be provided as an input to provide additional context to the image generation system when creating content. The query processing unit 132 implements a repository-based content generation pipeline 162 and an AI-based content generation pipeline 164. The repository-based content generation pipeline 162 implements the first generation mode of the image generation system in which the image generation system provides requested image content based on prestored image assets from an image asset repository 170 without using an AI model to generate the requested image contents. The repository-based content generation pipeline 162 implements the first generation mode of the image generation system in which the image generation system provides requested image contents based on prestored image assets from an image asset repository 170 without using an AI model to generate the requested image contents. In this context, without using the AI model to generate the requested image content in the first generation mode means that the repository-based content generation pipeline 162 implements the first generation mode of the image generation system to provide the requested image contents based on prestored image assets from the image asset repository 170 without any assistance of AI or with a limited assistance of AI to search and/or retrieve the prestored image assets but not to generate the actual requested image contents. The repository-based content generation pipeline 162 also implements the hybrid third image generation mode in which the image generation system combines image assets from the image asset repository 170 are combined with AI generated image assets to generate requested content.

Figure 2:
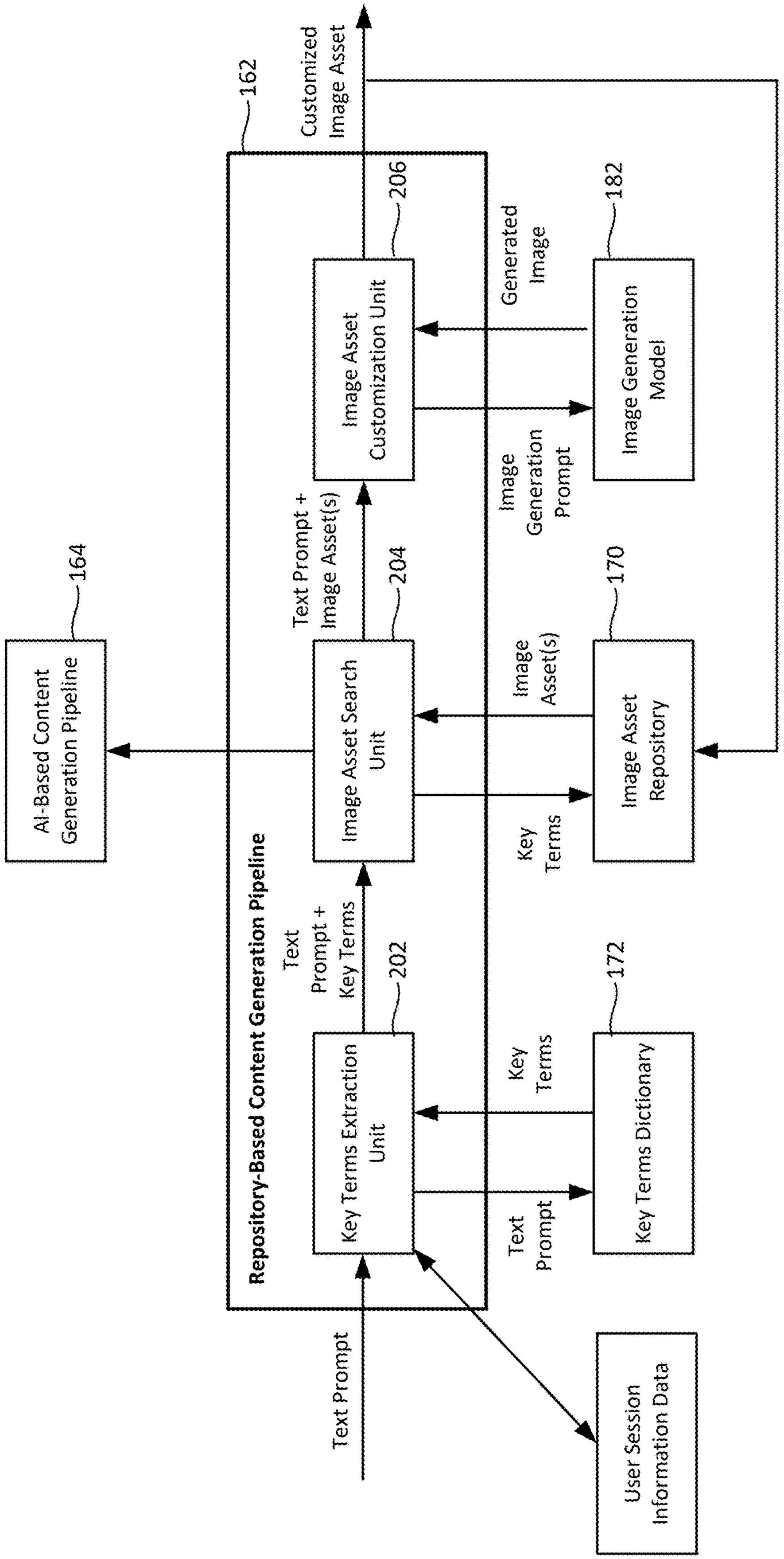
FIG. 2 is a diagram showing an example implementation of the repository-based content generation pipeline shown in FIG. 2.
Figure 3:
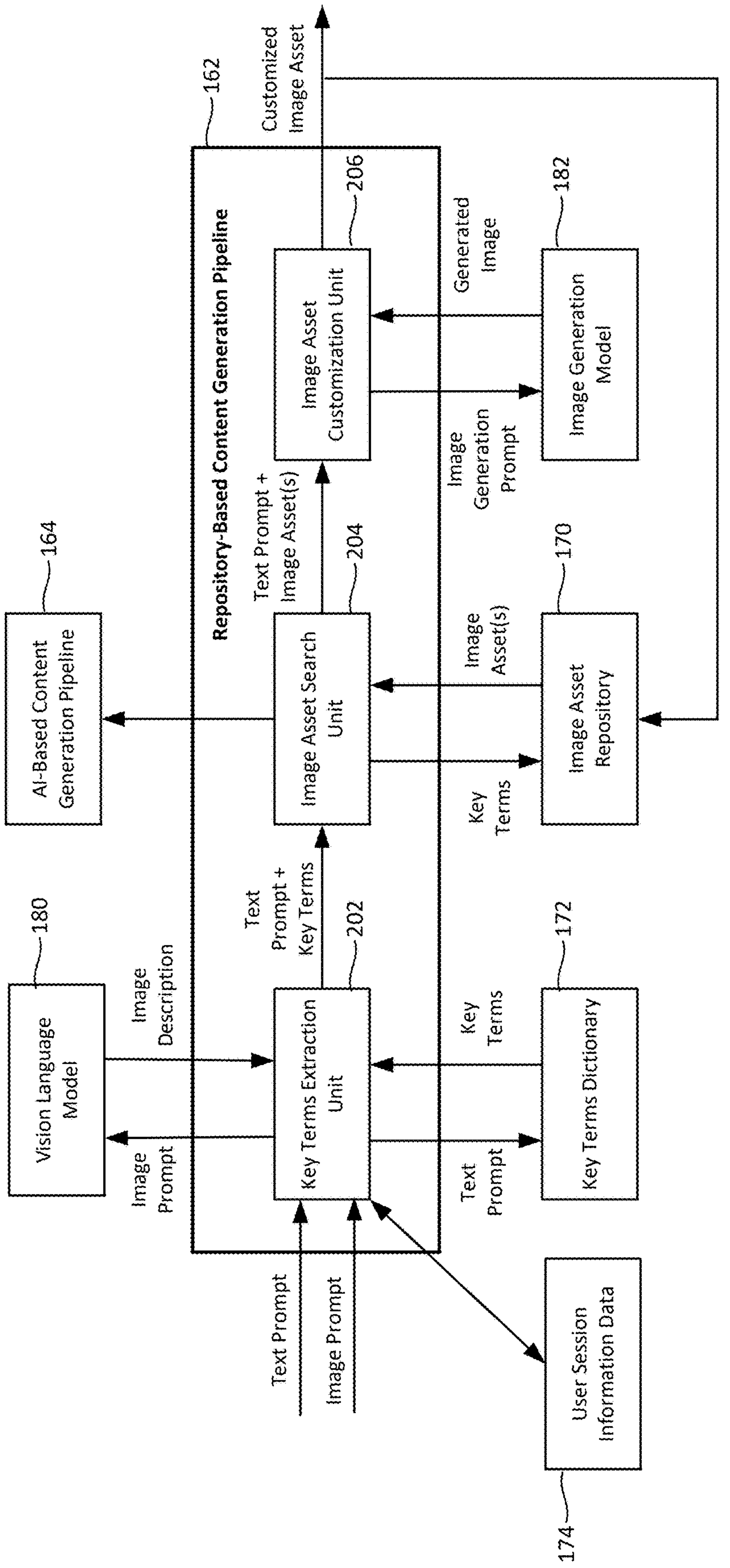
FIG. 3 is a diagram showing another example implementation of the repository-based content generation pipeline shown in FIG. 2.
Figure 4:
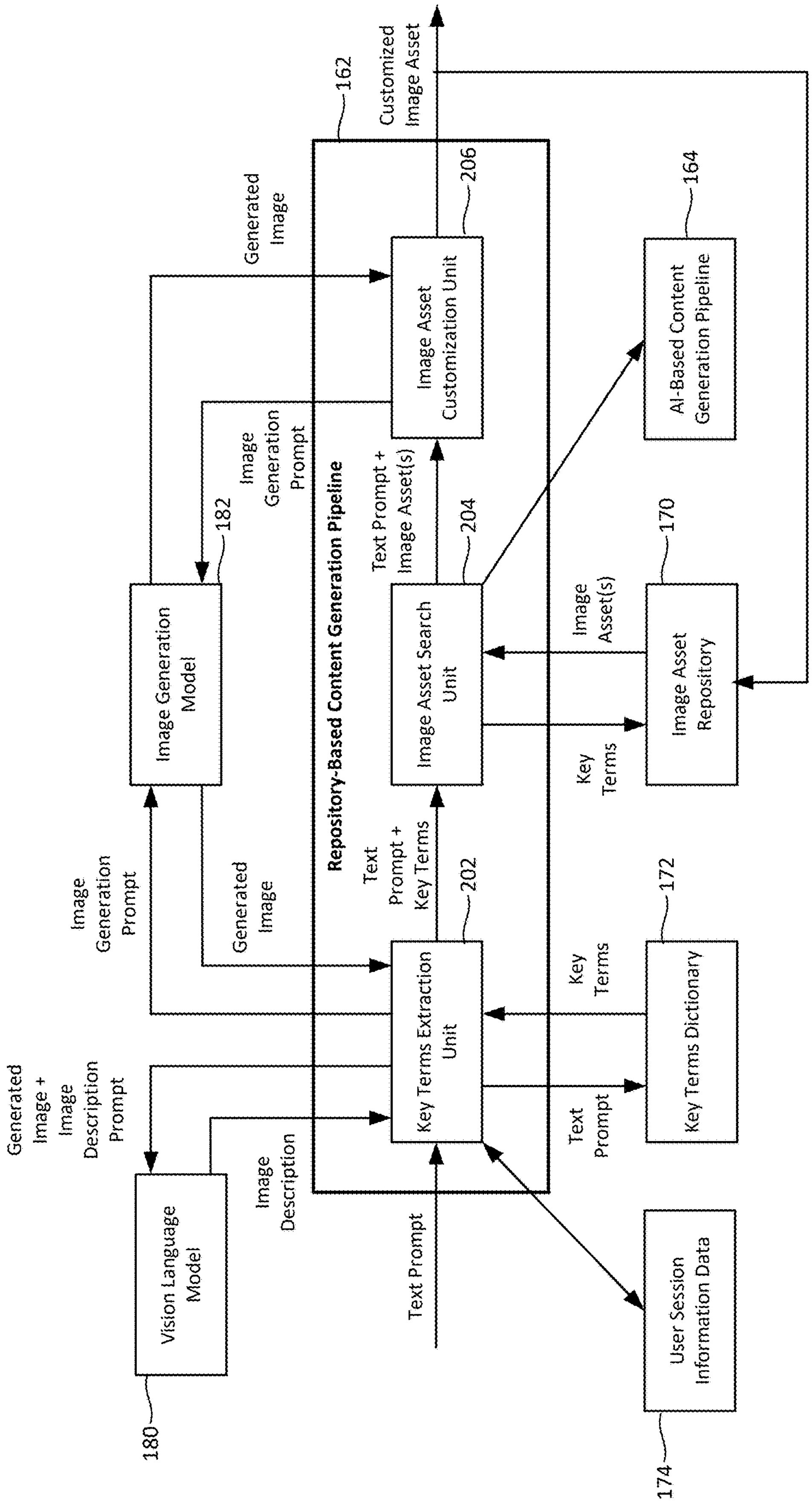
FIG. 4 is a diagram showing another example implementation of the repository-based content generation pipeline shown in FIG. 2.
Figure 5:
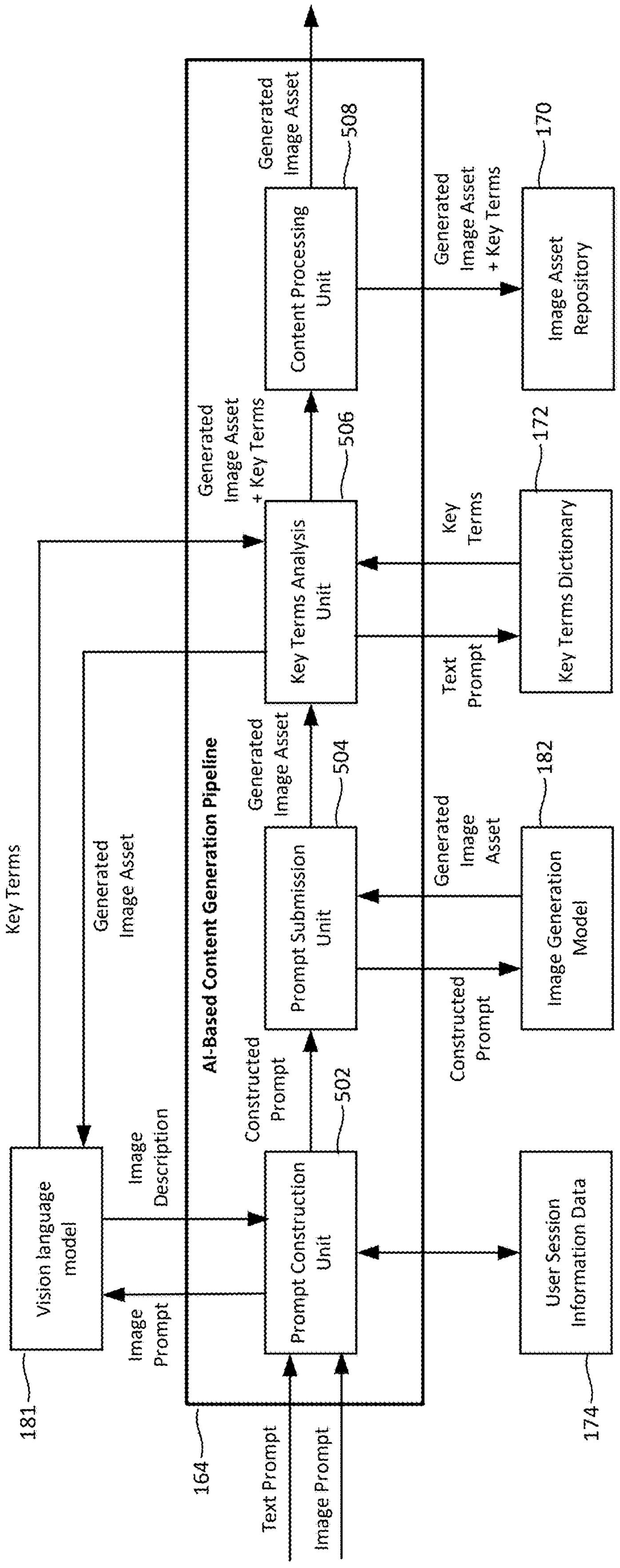
FIG. 5 is a diagram showing an example implementation of the AI-based content generation pipeline shown in FIG. 2.

The AI-based content generation pipeline 164 implements the second generation mode of the image generation system in which the image generation system generates the requested image contents using an AI model. The query processing unit 132 also includes user session information data 174. The user session information data 174 stores the textual and/or image prompts provided by the user and the content items generated by the image generation system during a series of interactions between the user and the image generation system. The user session information data 174 provides contextual information that the repository-based content generation pipeline 162 and the AI-based content generation pipeline 164 can use in instances in which the user submits prompts that requests that the image generation system revise image contents that were generated in response to a previous response during the user session. Example implementations of the repository-based content generation pipeline 162 are shown in FIGS. 2-4. An example implementation of the AI-based content generation pipeline 164 is shown in FIG. 5.

Figure 10A:
FIGS. 10A-10C are diagrams showing examples of some of the challenges related to utilizing an AI model to generate content that can be avoided using the image generation system described herein.
Figure 10B:
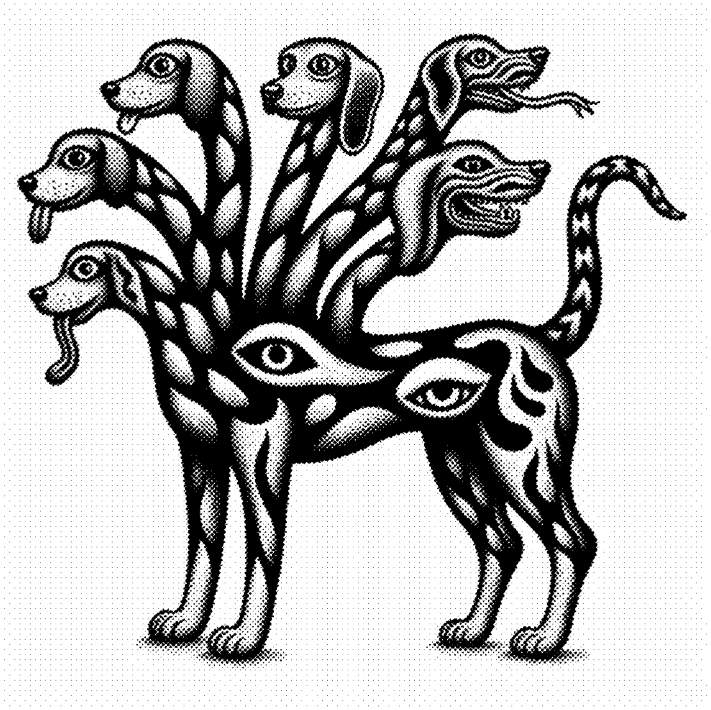
Figure 10C:
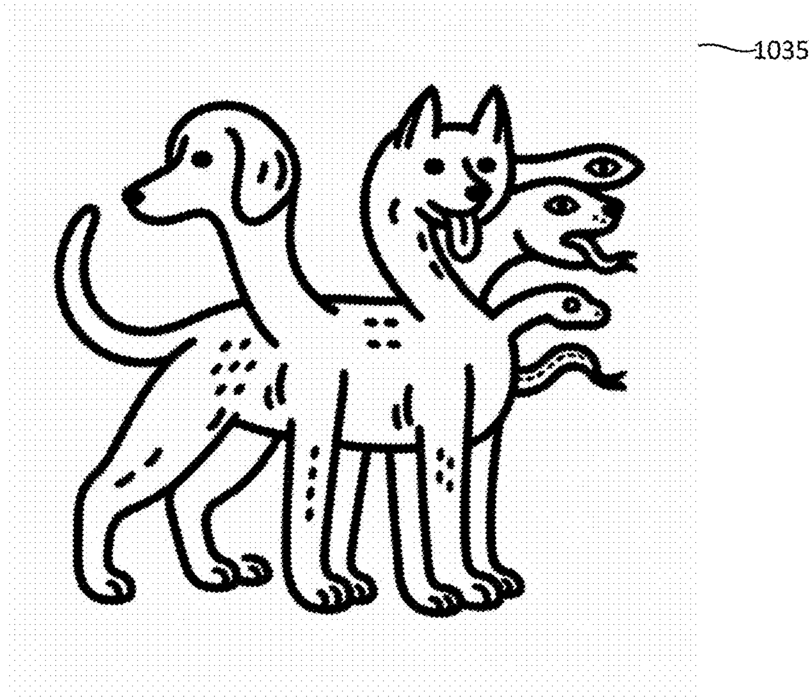

FIGS. 10A-10C are diagrams showing examples of some of the challenges related to utilizing an AI model to generate content that can be avoided using the image generation system operating under the hybrid mode as described herein. FIG. 10A shows an example textual prompt 1010 in which the user requests that a poster for a party be created. The prompt includes a specific title for the poster and a specific date, time, and location for the party. The sample image 1015 is an example of an AI-generated image generated using an AI model. The sample image 1015 shows some of the issues with the content that can arise when relying on an AI model to generate the requested content. For example, the sample image 1015 includes misspellings in the text throughout the poster, the title is incomplete, and there are errors in some of the images of the dogs that were added to the poster (e.g., extra legs, extra eyes, etc.). The image generation system provided herein avoids issues such as these by generating the textual content without relying on an image generation model, which can introduce artifacts such as these into the text of an image. The image generation system provided also avoid errors in the image assets by generating image content based on prestored image assets whenever possible and customizing these assets if necessary to satisfy the request from the user. The image generation system can also avoid other problems, such as the AI model omitting key elements from the generated content and/or including elements that are irrelevant.

FIGS. 10B and 10C show another shortcoming of using an AI model to generate image content. In FIG. 10B, the user has entered a prompt 1020 for a multiheaded dog image that specifies a specific number of legs, eyes, and other aspects of the image to be created. The sample image 1025 shows an example of what a generative AI model may generate in response to such a prompt. In FIG. 10C, the user attempts to have the model refine and revise the image 1025 and submits a prompt 1030 requesting specific changes to be made to the image. However, the AI model generates the image 1035 which is completely different than the sample image 1025 in response to the prompt 1030. Consequently, the user is unable to simply refine the previously generated image. The image generation system provided herein facilitates such incremental revisions to previously generated image content as discussed in the examples which follow without requiring that the image be regenerated completely.

FIG. 2 is a diagram showing an example implementation of the repository-based content generation pipeline 162 shown in FIG. 2. In the example implementation of the repository-based content generation pipeline 162 shown in FIG. 2, the repository-based content generation pipeline 162 is configured to receive a textual prompt input by a user. As discussed in the preceding examples, the user can input a prompt in the native application 114 and/or the web application 190 instructing the image generation system to generate requested image contents. The textual prompt is provided as an input to the key terms extraction unit 202. The repository-based content generation pipeline 162 shown in FIG. 2 is capable of operating in the first generation mode in which requested image content is generated using prestored image assets from the image asset repository and the hybrid generation model in which request image content is generated by combining image assets from the image asset repository 170 with image assets generated by using an AI model, such as the image generation model 182. A technical benefit of this approach is that the computational, energy, and water costs associated with providing an image generation system can be significantly reduced when operating the image generation system in the first generation mode and/or the hybrid generation model by utilizing prestored image assets to generate all or part of the requested image content. Another technical benefit of this approach is that the image generation system will utilize image assets in the image asset repository, which contains image assets that have already been curated, vetted, and otherwise proven to be desirable for servicing user requests, and which avoids known issues with generative AI models returning unexpected or undesirable results. Yet another technical benefit of the image generation system utilizing the hybrid generation mode is that the image generation system only relies on generative AI model for a smaller portion of the requested image content, which provides improved computational efficiency at run time due to the reduced role of the AI model in generating the request image content.

The key terms extraction unit 202 compares the textual prompt with a set of key terms in the key terms dictionary 172. The key terms dictionary 172 includes a fixed set of key terms that are recognized by the image generation system. These terms can be associated with image assets in the image asset repository 170. A technical benefit of this approach is that the image generation system can determine user intent from the textual prompt without relying on computationally intensive techniques to analyze the textual content, such as utilizing an AI model to analyze the textual prompt.

The textual prompt and the key terms are provided as an input to the image asset search unit 204. The image asset search unit 204 searches for image assets in the image asset repository 170 that are associated with the one or more key terms received from the image asset search unit 204. The image asset search unit 204 determines whether the image generation system includes prestored image content in the image asset repository 170 that satisfies a first threshold condition for providing the requested image content corresponding to the textual prompt. The image asset search unit 204 determines that the threshold condition is satisfied responsive to one or more of the following being satisfied: (1) the image asset repository 170 includes a prestored image asset that is associated with one or more key terms extracted from the first textual prompt that satisfies all of the requirements of the first textual prompt, (2) the image asset repository includes two or more image assets each associated with one or more key terms extracted from the first textual prompt, and the two or more image assets can be combined to generate a new image asset that satisfies all of the requirements of the first textual prompt; or (3) the image asset repository includes a prestored image asset or two or more prestored image assets that can be combined into a new image asset, and the prestored image asset or the new image asset can be customized by the repository-based content generation pipeline to create a customized image asset that satisfies the first textual prompt. The image asset search unit 204 determines whether the second threshold condition for providing the corresponding to the first textual prompt is satisfied when the image asset repository 170 where the following conditions are satisfied: (1) the first threshold condition is not satisfied, and (2) the image generation system includes less than all prestored image content in the image asset repository that satisfies the first textual prompt. The second threshold condition is satisfied when the image asset repository 170 includes prestored image assets that can be used to generate at least a portion of the requested image contents and any remaining portions of the requested image asset content can be generated using the image generation model 182. The image asset search unit 204 provides the one or more mage assets identified from the image asset repository 170 to the image asset customization unit 206. The image asset search unit 204 can also provide the textual prompt and/or the key terms extracted from the textual prompt to the image asset customization unit 206. The image asset search unit 204 can also provide an indication to image asset customization unit 206 that the image generation model is operating in the first, second, or third image generation model. If the image asset search unit 204 determines that no such prestored image assets are available in the image asset repository 170, the image asset search unit 204 provides the textual prompt and/or the keywords to the AI-based content generation pipeline 164 for generation according to the second generation mode.

The image asset search unit 204 can implement various search techniques for searching the image asset repository 170. The particular search techniques utilized depend at least in part on the structure of the image asset repository 170. The image asset search unit 204 can, in some implementations, implement an AI-based search engine. The AI-based search engine utilizes AI to understand the meaning of queries and to provide relevant search results. An AI-based search engine could be used to search for image assets in the image asset repository 170. For instance, the AI-based search engine can utilize the key terms extracted from textual prompt input by the user and/or the textual prompt to search for image assets in the image asset repository that are associated with semantically similar key words and/or concepts expressed in the image prompt. In such an approach, the AI-based search engine can analyze the key terms and/or the user prompt and generate embeddings that provide a numerical vector representation of the key terms and/or user prompt into a vector space that the key terms associated with the image assets in the image asset repository have been mapped. Image assets having vector representations that are mapped closer to the vector representations of the key terms and/or the user prompt in the vector space are more semantically similar to the key terms and/or the user prompt than those that are mapped farther away in the vector space. A technical benefit of this approach is that the AI-based search engine may identify image assets having a semantic similarity but do not match exactly. In a non-limiting example, the user prompt may request a picture of a black feline, and the AI-based search engine may match this with a black cat, black panther, black puma, and/or other semantically related image assets.

The usage of such an AI-based search engine is independent from the generation of image assets using an AI model. In implementations that utilize AI-based search, the repository-based content generation pipeline 162 can still generate image content using prestored image assets from the image asset repository 170 without relying on an AI model to generate these image assets. A technical benefit of this approach is that the usage of computationally expensive models to generate image content can be reduced while still providing relevant matches for prestored image assets from the image asset repository 170 by using the AI-based search.

The image asset search unit 204 utilizes location information when selecting image assets from the image asset repository in some implementations. The image assets may can be associated with geofencing and/or geotargeting information that associates image assets with a specific geographical location or area. The image assets can be associated with location triggers that require the user to be located within or without a particular geographical location or area in order for the image asset search unit 204 to utilize these image assets when generating requested image content. The location of the user submitting the prompt requesting image contents can be obtained based on the Internet Protocol (IP) address of their client device and/or based on other location information associated with the user. A technical benefit of this approach is that the image generation system can provide results that better align with the demographic trends for a particular area, protect cultural sensitivities, and/or adhere to brand guidelines and marketing trends.

The image asset customization unit 206 analyzes the keywords and/or textual prompt to determine whether the image assets obtained from the image asset repository 170 satisfies less than all image elements required for the first image content satisfying the textual prompt. Responsive to determining that the image assets obtained from the image asset repository 170 includes image assets that either satisfy the textual prompt or can be customized without utilizing an AI model, the image asset customization unit 206 operates the image generation system in the first operating mode and generates the requested image content based on the available image assets. Responsive to determining that the image assets obtained from the image asset repository lacks an image asset that satisfies at least one image element of the requested image content requested by the textual prompt, the image asset customization unit 206 operates the image generation system in the hybrid operating mode and generates a first portion of the requested image content using the prestored image assets from the image asset repository 170 and a second portion of the requested image content using an AI model, such as the image generation model 182. The second portion corresponds to at least one second image element of the first image content for which the image asset repository does not have a corresponding prestored image asset. The image asset customization unit 206 automatically constructs the requested image content based on the first portion and the second portion.

The image asset customization unit 206 can customize prestored image assets when operating in either the first generation mode or the hybrid generation mode. The image asset customization unit 206 analyzes the keywords and/or textual prompt to determine whether any of the image assets identified by the image asset search unit 204 need to be customized in order to satisfy the request for image contents in the textual prompt. The image asset customization unit 206 can customize various attributes of the image assets identified by the image asset search unit 204 using means that do not require an AI model to generate the customized content. For example, the image asset customization unit 206 can perform various types of customizations on the image assets, including but not limited to resizing of the image assets, cropping image assets, modifying a color value or color values of the image asset, modifying a transparency of the of the image assets, rotating and/or scaling the image assets, altering an aspect ratio of the image assets, and/or other such modifications to the prestored image assets. Modifying the color values can include changing the hue, saturation, and/or lightness of one or more portions of the prestored image asset. Changing the hue refers to changing the base color, such as but not limited to changing the color from green to magenta. The saturation refers to how intensely the color is represented, typically from a very pale gray to a full representation of the color. The lightness of the color refers to how light or dark the color appears based on the amount of white or black mixed with the hue. The image asset customization unit 206 can alter the image files of the prestored image assets to perform these customizations without relying on an AI model to alter the image files.

The image asset customization unit 206 modifies the one or more attributes of the image assets, if necessary, and outputs the customized image assets. The image asset customization unit 206 can also add the customized image assets to the image asset repository 170. A technical benefit of this approach is that these assets can be used to fulfill future requests for image contents. The examples which follow provide additional details of how the image asset customization unit 206 can modify the image assets to generate the customized image asset.

The image asset customization unit 206 utilizes the image generation model 182 to generate one or more image assets that can be combined with the image assets obtained from the image asset repository 170 when operating in the hybrid generation mode. The image asset customization unit 206 constructs a prompt for the image generation model 182 that instructs the image generation model to generate image assets required to construct the requested image asset. The image asset customization unit 206 constructs the prompt to the image generation model 182 based on the textual prompt input by the user and/or the keywords extracted from the textual prompt by the key terms extraction unit 202. The image asset customization unit 206 can construct multiple prompts to the image generation model 182 where more than one image asset is required. The image asset customization unit 206 combines the prestored image assets with the image assets generated by the image generation model 182. The image asset customization unit 206 can generate the requested image asset by compositing the prestored image assets and the generated image assets. In some implementations, the image asset customization unit 206 constructs another prompt to the image generation model 182 instructing the image generation model 182 to construct the requested image content from the prestored image assets and the generated image assets.

The image asset customization unit 206 can also add text to the generated image assets. As discussed previously, AI generative models often generate erroneous and/or nonsensical text in response to user prompts. The image asset customization unit 206 can analyze the user prompt to add requested textual components to the generated image assets. For instance, the text can include but is not limited to dates, times, titles, descriptions, and/or other textual content to the generate image content that accurately represents the user request.

The repository-based content generation pipeline 162 utilizes the user session information data 174 in instances in which the user inputs a textual prompt to revise the image asset that was generated in response to a textual prompt that was previously submitted. In such implementations, the image asset search unit 204 can identify image assets and/or tokens that can be used to customize the previously generated image asset, and the image asset customization unit 206 can customize the image asset using the additional image assets and/or tokens. FIGS. 6B and 6C, which are discussed in detail below, show examples of the image generation system revising image assets using these techniques.

FIG. 3 is a diagram showing another example implementation of the repository-based content generation pipeline 162 shown in FIG. 2. In the implementation shown in FIG. 3, the textual prompt input by the user is accompanied by an image prompt. The image prompt provides additional context to the image generation system. The repository-based content generation pipeline 162 shown in FIG. 3 is capable of operating in the first generation mode in which requested image content is generated using prestored image assets from the image asset repository and the hybrid generation model in which request image content is generated by combining image assets from the image asset repository 170 with image assets generated by using an AI model, such as the image generation model 182. A technical benefit of this approach is that the computational, energy, and water costs associated with providing an image generation system can be significantly reduced when operating the image generation system in the first generation mode and/or the hybrid generation model by utilizing prestored image assets to generate all or part of the requested image content. Another technical benefit of this approach is that the image generation system will utilize image assets in the image asset repository, which contains image assets that have already been curated, vetted, and otherwise proven to be desirable for servicing user requests, and which avoids known issues with generative AI models returning unexpected or undesirable results. Yet another technical benefit of the image generation system utilizing the hybrid generation mode is that the image generation system only relies on generative AI model for a smaller portion of the requested image content, which provides improved computational efficiency at run time due to the reduced role of the AI model in generating the request image content.

The key terms extraction unit 202 compares the textual prompt with a set of key terms in the key terms dictionary 172 to extract first key terms from the textual prompt. The key terms extraction unit 202 also constructs a prompt for the vision language model 181 instructing the vision language model 181 to analyze the image prompt and to generate a description of the example image provided as the image prompt. The key terms extraction unit 202 provides the prompt and the image prompt as inputs to the vision language model 181 and obtains the description of the image prompt as an output of the vision language model 181. The key terms extraction unit 202 the analyzes the description of the example image to extract additional key terms from the description. These additional key terms are added to the first key terms extracted from the textual prompt. The key terms extraction unit 202 then provides the key terms and the textual prompt to the image asset search unit 204. The remainder of the components of the repository-based content generation pipeline 162 operate similarly to the embodiment shown in FIG. 2 to generate the requested image asset.

While the implementation of the repository-based content generation pipeline 162 shown in FIG. 3 can receive an image prompt as an input, other implementations can receive an audio prompt, video prompt, document prompt, and/or other types of prompts. In such implementations, these prompts are analyzed using a language model that is capable of analyzing the type of input provided to obtain a description of the prompt. The description is then analyzed by the key terms extraction unit in a manner similar to that discussed above with respect to the image prompt.

FIG. 4 is a diagram showing another example implementation of the repository-based content generation pipeline 162 shown in FIGS. 2 and 3. The repository-based content generation pipeline 162 shown in FIG. 4 is capable of operating in the first generation mode in which requested image content is generated using prestored image assets from the image asset repository and the hybrid generation model in which request image content is generated by combining image assets from the image asset repository 170 with image assets generated by using an AI model, such as the image generation model 182. A technical benefit of this approach is that the computational, energy, and water costs associated with providing an image generation system can be significantly reduced when operating the image generation system in the first generation mode and/or the hybrid generation model by utilizing prestored image assets to generate all or part of the requested image content. Another technical benefit of this approach is that the image generation system will utilize image assets in the image asset repository, which contains image assets that have already been curated, vetted, and otherwise proven to be desirable for servicing user requests, and which avoids known issues with generative AI models returning unexpected or undesirable results. Yet another technical benefit of the image generation system utilizing the hybrid generation mode is that the image generation system only relies on generative AI model for a smaller portion of the requested image content, which provides improved computational efficiency at run time due to the reduced role of the AI model in generating the request image content.

In the example implementation of the repository-based content generation pipeline 162 shown in FIG. 4, the repository-based content generation pipeline 162 makes limited use of the vision language model 181 where the key terms extraction unit 202 determines that the prompt does not include any key terms included in fixed set of key terms included in the key terms dictionary 172. Consequently, the image asset repository 170 will also lack any image assets that satisfy the user prompt, because the image assets stored in the image asset repository 170 are mapped to terms included in the key terms dictionary 172. In this implementation, the key terms extraction unit 202 constructs a first prompt, also referred to herein as an image generation prompts, for the image generation model 182. The first prompt instructs the image generation model 182 to generate a generated image no larger than a predetermined size limit based on the first textual prompt input by the user. The predetermined size limit is selected to reduce the computational resources required to create the generated image. The key terms extraction unit 202 provides the first prompt. The key terms extraction unit 202 constructs a second prompt to the vision language model 181 to analyze the generated image and to generate a description of the generated image. The key terms extraction unit 202 provides the second prompt and the generated image as an input to the vision language model 181 and obtains a description of the generated image an output from the vision language model 181. The key terms extraction unit 202 then analyzes the description of the generated image using the key terms dictionary 172 to extract key terms from the description of the generated image. If the key terms extraction unit 202 is able to extract one or more key terms from the description of the generated image, the key terms extraction unit 202 provides the one or more key terms and the textual prompt to the image asset search unit 204 to search for image assets in the image asset repository 170. The remainder of the elements of the repository-based content generation pipeline 162 operate in a similar manner as the implementations of the repository-based content generation pipeline 162 shown in FIGS. 2 and 3. A technical benefit of the approach taken by the implementation shown in FIG. 3 is that the image generation system can utilize prestored image assets to generate requested image content in situations in which the prompt entered by the user does not have an exact match for the key terms included in the key terms dictionary 172. Another technical benefit of this approach is that the size of the image generated by the image generation model 182 is limited to a predefined image size that is much smaller than the size of the images typically generated by the image generation model 182, which helps to reduce the computing and energy resources utilized to generate the requested image content.

FIG. 5 is a diagram showing an example implementation of the AI-based content generation pipeline 164 shown in FIG. 2. The AI-based content generation pipeline 164 can be used by the image generation system to generate requested image content using one or more AI models in instances in which the repository-based content generation pipeline 162 determines that the image asset repository 170 does not include image assets that satisfy a prompt input by the user. As discussed in the preceding examples, the prompt input by the user may be textual prompt input by the user. The textual prompt may provide natural language instructions that instruct the image generation system to generate requested image contents. The textual prompt may be input in a structured query language in some implementations in addition to or instead of natural language prompts. The textual prompt may also be associated with an image prompt as discussed in the preceding examples. For instance, the image prompt can be provided as an input by the user inputting the textual prompt to provide additional context to the image generation system when creating requested content.

The prompt construction unit 502 receives the textual prompt and the optional image prompt. The prompt construction unit 502 constructs a prompt for the vision language model 181 instructing the vision language model 181 to analyze the image prompt and to generate a description of the example image provided as the image prompt. The key terms extraction unit 202 provides the prompt and the image prompt as inputs to the vision language model 181 and obtains the description of the image prompt as an output of the vision language model 181. The prompt construction unit 502 then constructs a prompt for the image generation model 182 based on the textual prompt and the description of the image prompt. In some implementations, the prompt construction unit 502 utilize a prompt template that provides instructions to the image generation model 182 when generating the image content. The prompt submission unit 504 provides the prompt that was constructed by the prompt construction unit 502 as an input to the image generation model 182 and obtains a generated image asset as an output from the image generation model 182.

The key terms analysis unit 506 receives the generated image asset from the prompt submission unit 504. The key terms analysis unit 506 constructs a prompt to the vision language model 181 to cause the vision language model to analyze the generated image asset and generate a set of key terms that describe the generated image asset. In other implementations, the key terms analysis unit 506 constructs a prompt to the vision language model 181 to generate a textual description of the generated image asset. The key terms analysis unit analyzes the key terms and/or the description of the generated image asset to identify key terms included in the key terms dictionary 172. The key terms analysis unit 506 provides the key terms associated with the generated image and the generated image asset to the content processing unit 508.

The content processing unit 508 can perform various actions on the generated image asset. For instance, the generated image asset can be provided to the native application 114 and/or the web application 190 to present on a user interface of the application to present the generated image asset to the user. The user may input additional prompts to cause the image generation system to further refine the generated image asset. The content processing unit 508 can also add the generated image asset to the image asset repository 170 and associate the generated image asset with the key terms determined by the key terms analysis unit 506 so that the image generation system can provide the generated image asset in response to future requests to generate image contents to enable the image generation system to utilize prestored image assets rather than having to generate new image assets with an AI model. The content processing unit 508 can provide the generated image asset and the associated key terms to an administrator to obtain authorization before adding the generated image asset to the image asset repository 170. The image generation system can provide a user interface that enables the administrator to review the generated image asset, the key terms, the textual prompt, and the optional image prompt. The user interface enables the administrator to approve or reject the addition of the generated image asset to the image asset repository 170. The user interface also enables the administrator to edit the key terms associated with the generated image asset to select key terms from the key terms dictionary 172 that are more appropriate than those that were automatically selected by the key terms analysis unit 506. A technical benefit provided by this approach is that the administrator reviews the content that we generated using the AI model or models to ensure that the content is correctly characterized by the key terms and does not include any potentially offensive content that was inadvertently generated by the AI model. The image generation system can also include other protections, such as but not limited to the analyzing of the textual prompts and/or the image prompts using an automated moderation service (not shown) that utilizes one or more models to automatically analyze the prompts to detect and reject prompts that are include or are requesting that the model generate potentially offensive content.

Figure 6A:
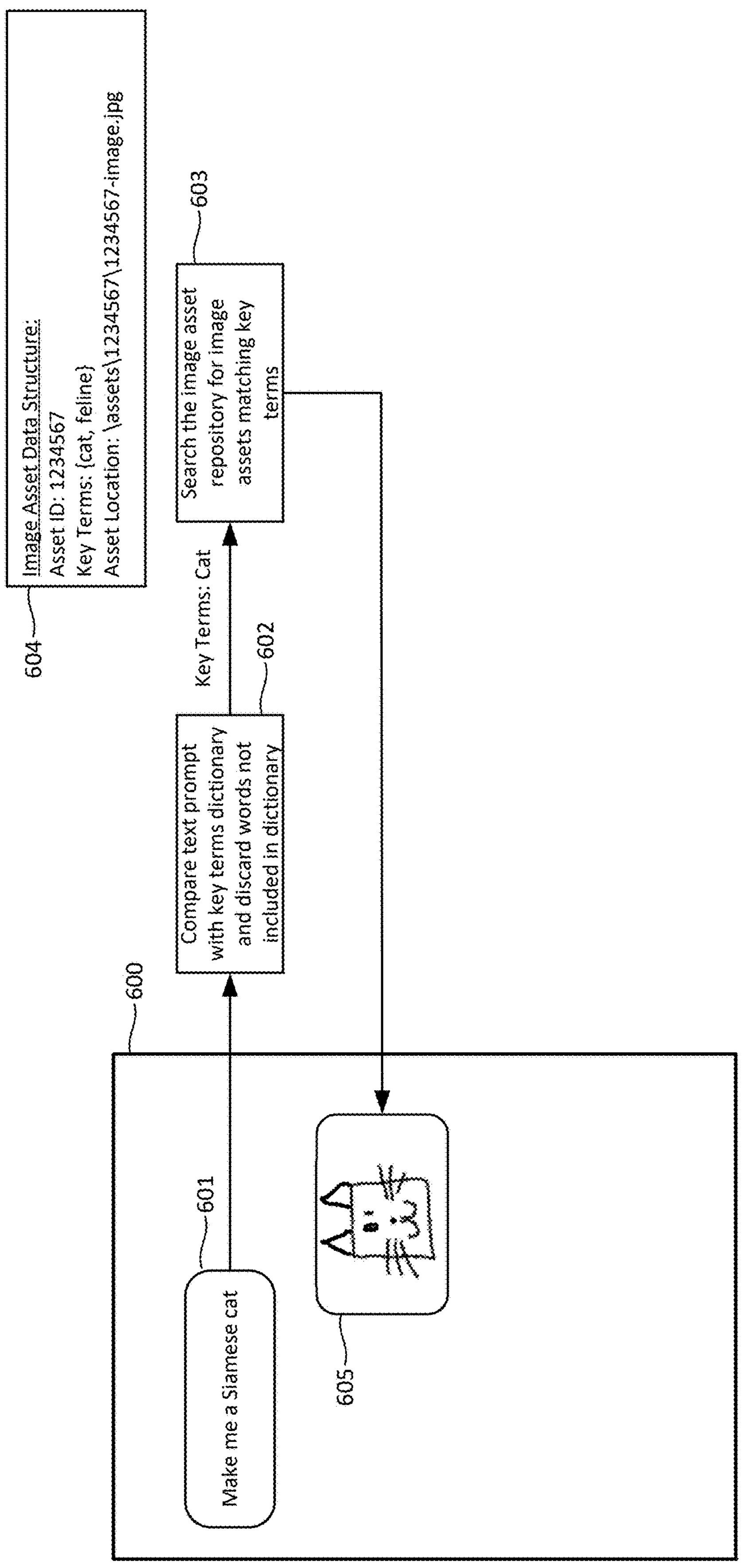
FIG. 6A-6G provide examples of user interactions with the image generation system implemented in the preceding figures.
Figure 6B:
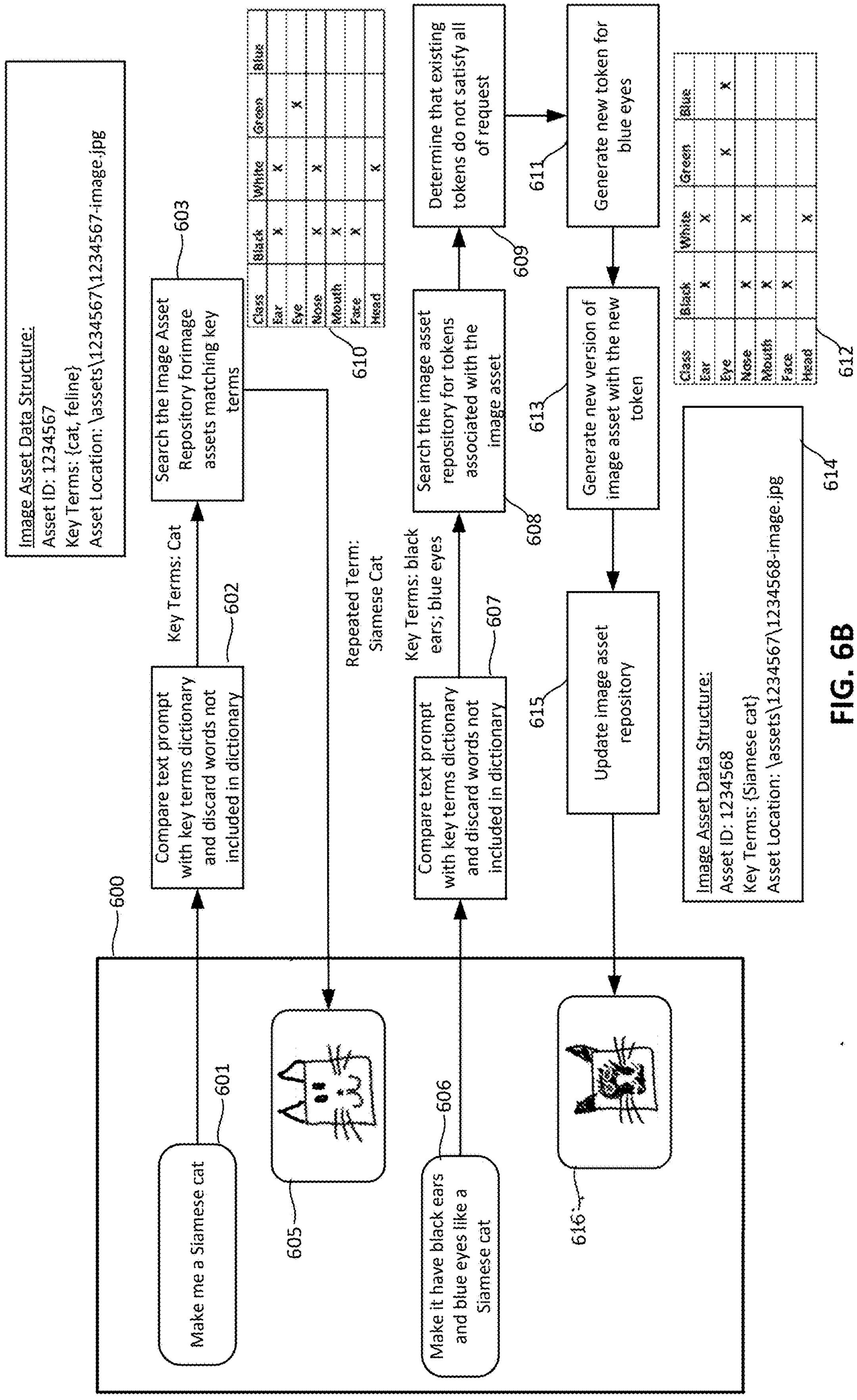
Figure 6C:
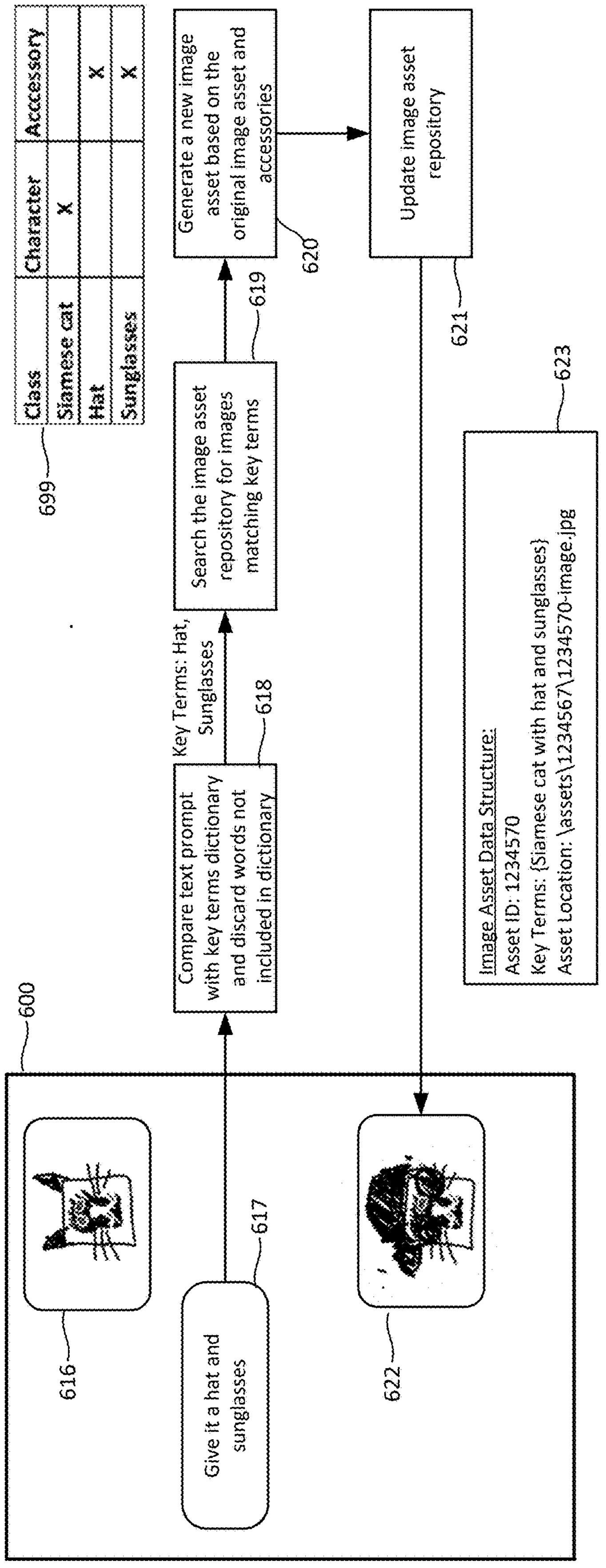

FIG. 6A-6F provide examples of user interactions with the image generation system discussed in the preceding figures. FIG. 6A shows an example in which a user interacts with the image generation system from a user interface 600 of an application, such as the native application 114 or the web application 190 shown in FIG. 1A. The application provides a chat user interface that enables the user to input textual prompts that instruct the image generation system to create requested image content. In the examples shown in FIGS. 6A-6F, the textual prompts input by the user are natural language prompts, but the textual prompts can be input as structured query text in other implementations or a combination of natural language and structured query language.

The user inputs a textual prompt 601 requesting that the image generation system generate an image of a Siamese cat. The application provides the textual prompt to the request processing unit 120 and the request processing unit 120 provides the textual prompt to the query processing unit 132 for processing. In operation 602, the key terms extraction unit 202 of the repository-based content generation pipeline 162 analyzes the textual prompt by comparing the textual prompt with the key terms included in the key terms dictionary 172. In this example, the key terms dictionary 172 includes the key term "cat" and the repository-based content generation pipeline 162 discards rest of the words of the user prompt when formulating a search query for identifying image assets in the image asset repository 170. In operation 603, the image asset search unit 204 of the repository-based content generation pipeline 162 searches for image assets that are associated with the key term "cat" in the image assets. In this example, the image asset search unit 204 of the of the repository-based content generation pipeline 162 determines that the first threshold condition for providing prestored image assets from the image asset repository 170 in response to the prompt input by the user. The first threshold condition is satisfied because the condition that the image asset repository 170 includes a prestored image asset that is associated with one or more key terms extracted from the first textual prompt that satisfies all of the requirements of the first textual prompt has been satisfied. The image asset search unit 204 locates an image asset 604 that is associated with the key term and outputs this image asset. The query processing unit 132 provides the image asset to the request processing unit 120, and the request processing unit 120 provides the image asset to the application. The application then presents a representation 605 of the image asset 604 on the user interface 600.

FIG. 6B provides an example of a continuation of the user interaction shown in FIG. 6A in which the user requests that the image generated by the image generation system be customized. In the example shown in FIG. 6B, the image asset search unit 204 determines that the image generation system includes prestored image content in the image asset repository 170 that satisfies the first threshold condition for providing prestored image assets from the image asset repository 170 in response to the prompt input by the user. The first threshold condition is satisfied because the image asset repository 170 includes a prestored image asset that can be customized by the repository-based content generation pipeline to create a customized image asset that satisfies the textual prompt. In some implementations, the image assets in the image asset repository 170 can comprise one or more tokens. The tokens are image components associated with a respective image asset that can be combined in various combinations to create different versions of the image asset. In the example shown in FIG. 6B, the cat image asset is associated with several tokens 610: an ear token, an eye token, a nose token, a mouth token, a face token, and a head token. Furthermore, there may multiple versions of each of the tokens that have different attributes. For instance, multiple versions of the token may be created that have different colors as in the example shown in FIG. 6B. The differences in the attributes of the tokens is not limited to variations in color. Other attributes may also vary among the multiple versions of the tokens, such as but not limited to the size, orientation, and/or transparency of the tokens.

In the example shown in FIG. 6B, the user inputs a second textual prompt 606 requesting that the cat be modified to have black ears and blue eyes. The version of the image asset shown in representation 605 of the image asset 604 includes white ears and green eyes. The repository-based content generation pipeline 162 analyzes the second textual prompt 606 and extract the keywords from the second prompt in operation 607. The key terms include “black ears” and “blue eyes” in this example. In operation 608, the image asset search accesses the image asset repository 170 to obtain the token information 610. In operation 609, the image asset search unit 204 determines whether the cat image asset is associated with tokens having the requested attributes are associated with the cat image asset. The token information 610 shows that there is a “black ears” token associated with the cat image asset, but there is not a “blue eyes” token associated with the cat image asset. In operation 611, the image asset customization unit 206 generates the “blue eyes” from the “green eyes” token by modifying the color attributes. The image asset customization unit 206 can use various means for modifying the color attributes. The image asset customization unit 206 can utilize filters or other methods to modify attributes of existing tokens. For instance, the image asset customization unit 206 can modify the color values in the image asset to create a new version of the existing token. The image asset customization unit can change the numeric values representing specific colors in the image file of the existing token. The updated token information 612 includes the blue eyes token. In operation 613, the image asset customization unit 206 assembles a new version of the cat image asset from the updated set of tokens. In operation 615, the image asset customization unit 206 adds the newly created token to the image asset repository 170 and associates the token with the cat image asset. A technical benefit of this approach is that the newly created tokens can then be used to create new variations of a prestored image asset in response to subsequently received textual prompts input by users of the image generation system. The image asset customization unit 206 can also add the new version of the image asset to the image asset repository 170. In this example, a new image asset 614 is created associated with the key terms “Siamese cat” so that future textual prompts that include these key words can utilize this prestored image asset.

The query processing unit 132 provides the image asset to the request processing unit 120, and the request processing unit 120 provides the image asset to the application. The application then presents a representation 616 of the image asset 614 on the user interface 600.

FIG. 6C provides another example of user interactions with the image generation system. In the example shown in FIG. 6C, the image asset search unit 204 determines that the image generation system includes prestored image content in the image asset repository 170 that satisfies the first threshold condition for providing prestored image assets from the image asset repository 170 in response to the prompt input by the user. The threshold condition is satisfied because the image asset repository 170 includes two or more image assets each associated with one or more key terms extracted from the first textual prompt, and the two or more image assets can be combined to generate a new image asset that satisfies all of the requirements of the first textual prompt. The example of FIG. 6C shows how the image generation system can combine prestored image assets to create a new image asset in response to a textual prompt from a user. In the example shown in FIG. 6C, the user interaction continues from that show in FIG. 6B, in which the representation 616 of the image asset 614 is presented on the user interface 600. The user enters a third textual prompt 617 that instructs the image generation system to add a hat and sunglasses to the Siamese cat image asset generated in the preceding example. In operation 618, the key terms extraction unit 202 of the repository-based content generation pipeline 162 analyzes the textual prompt 617 by comparing the textual prompt with the key terms included in the key terms dictionary 172 to extract the key terms “hat” and “sunglasses” from the textual prompt 617. In operation 619, the image asset search unit 204 of the repository-based content generation pipeline 162 searches for image assets that are associated with the key terms “hat” and “sunglasses” in the image assets. The image asset search unit 204 determines that there is a hat image asset and a sunglasses image asset in the image asset repository 170. The hat image asset and the sunglasses image asset are marked as “accessory” type image assets while the cat image asset is marked as a “character” type image asset. These labels indicate that these image assets can be combined to create a new image asset. The image asset repository 170 can include other types of labels that can be associated with image assets and information indicating which type of labeled assets can be combined to create new image assets and how these image assets can be combined. The image assets 699 are the image assets that were identified in operation 619. In operation 620, the image asset customization unit 206 combines the Siamese cat image asset, the hat asset, and the sunglasses asset to create a new image asset. Alternatively, in some implementations, the existing cat image asset can be updated rather than creating a new image asset in operation 620. The image asset customization unit stores the new image asset in the image asset repository 170 as image asset 623 in operation 621. The query processing unit 132 provides the new image asset to the request processing unit 120, and the request processing unit 120 provides the image asset 623 to the application. The application then presents a representation 622 of the image asset 623 on the user interface 600.

Figure 6D:
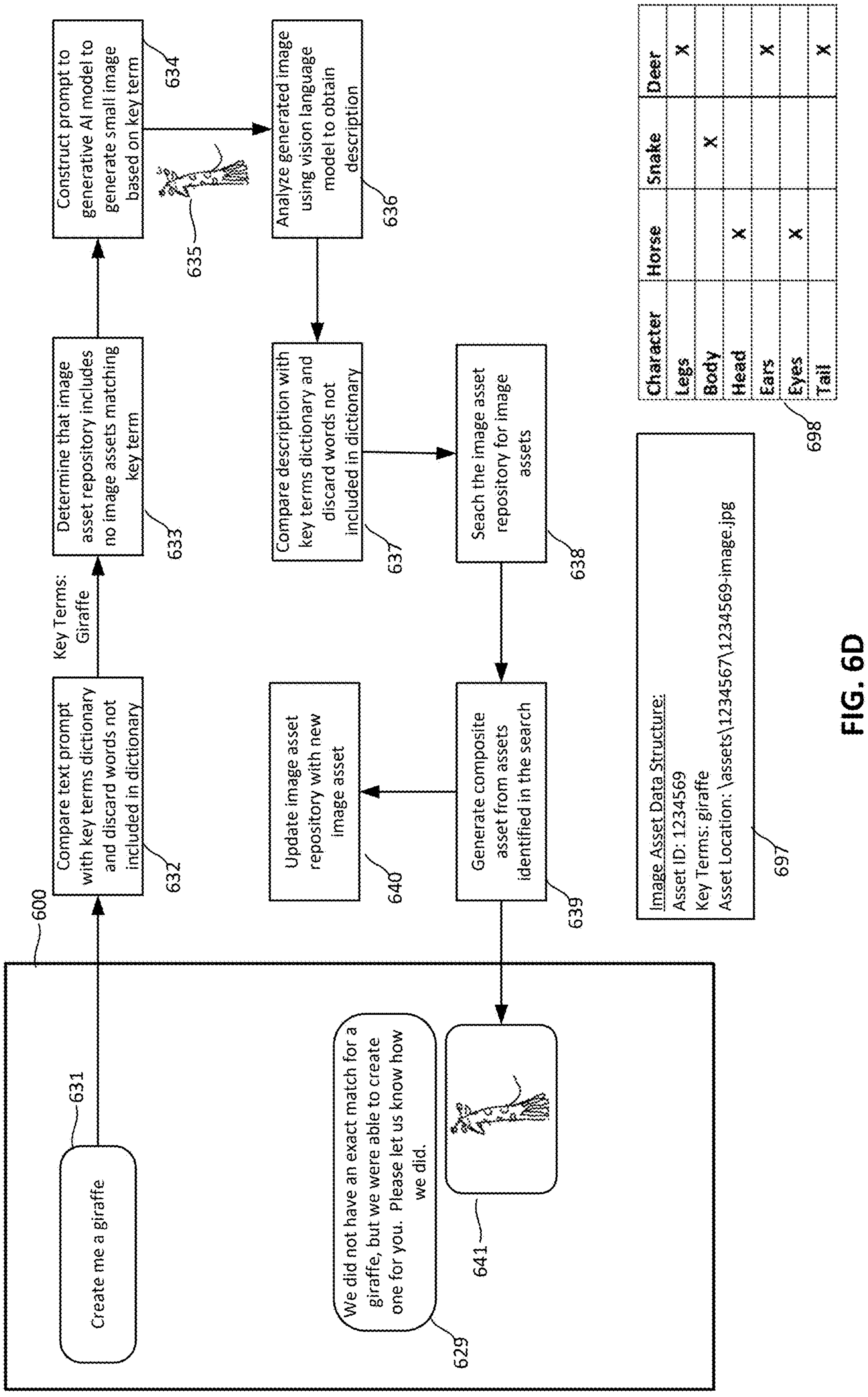

FIG. 6D provides another example of user interactions with the image generation system that utilizes the implementation of the repository-based content generation pipeline 162 shown in FIG. 4. In the example shown in FIG. 6D, the image asset search unit 204 determines that the image generation system includes prestored image content in the image asset repository 170 that satisfies the first threshold condition for providing prestored image assets from the image asset repository 170 in response to the prompt input by the user. The threshold condition is satisfied because the image asset repository 170 includes two or more image assets can be combined to generate a new image asset that satisfies all of the requirements of the first textual prompt even though there is not an exact match for the key terms in the image asset repository 170. In this example, the user inputs a textual prompt 631 requesting that the image generation system generate an image of a giraffe. In operation 632, the key terms extraction unit 202 of the repository-based content generation pipeline 162 analyzes the textual prompt 631 by comparing the textual prompt with the key terms included in the key terms dictionary 172. In this example, the key terms dictionary 172 includes the key term “giraffe” but, in operation 633, the image asset search unit 204 determines that the image asset repository 170 does not include an image asset associated with the key term “giraffe” among the image assets stored therein. Accordingly, in some implementations, the image asset search unit 204 provides the textual prompt and the key terms to the AI-based content generation pipeline 164 and the AI-based content generation pipeline 164 generates an image asset based on the textual prompt. In other implementations, such as the implementation shown in FIG. 6D, the image asset search unit 204 provides an indication to the key terms extraction unit 202 that the image asset repository 170 did not include any image assets associated with the term “giraffe” stored therein, which causes the key terms extraction unit 202 to construct a prompt to the image generation model 182 instructing the image generation model 182 to generate an image based on the prompt and/or the key terms that is no larger than a predetermined size limit. The key terms extraction unit 202 provides the prompt as an input to the image generation model 182, and the image generation model 182 generates and outputs the image 635 in operation 634. The key terms extraction unit 202 constructs a prompt to the vision language model 181 to generate a description of the attributes of the image. In operation 636, the key terms extraction unit 202 constructs a prompt to the vision language model 181 to analyze the image 635 and to generate a description of the image 635. In operation 637, the key terms extraction unit 202 analyzes the description of the image 635 to extract key terms from the description. For instance, the vision language model 181 may provide a description of the attributes of the giraffe that includes: long neck, long legs, body shaped like the body of a horse, long tail, and other such attributes. In operation 638, the key terms extraction unit 202 provides the key terms associated with these attributes to the image asset search unit 204 to conduct a search for image assets in the image asset repository 170 that can be combined to generate an image that is at least an approximate representation of a giraffe based on the attributes of the giraffe. In operation 639, the image asset customization unit 206 generates a composite image from the image assets identified by the key terms extraction unit 202. The image assets 698 include an example of the image assets included in the image asset repository 170. The image asset customization unit 206 can also optionally add the new version of the image asset to the image asset repository 170 in operation 640. In this example, a new image asset 697 is created associated with the key term “giraffe” so that future textual prompts that include these key words can utilize this prestored image asset. The query processing unit 132 provides the image asset to the request processing unit 120, and the request processing unit 120 provides the image asset to the application. The application then presents a representation 641 of the image asset 697 on the user interface 600. A disclaimer 629 can also be generated by the image asset customization unit 206 that an exact match for the requested giraffe image could not be found so the image generation system generated the image asset 697. The user can provide feedback if the image asset 697 is unsuitable or needs to be further refined.

The image asset customization unit 206 can consider positional, scaling, and rotational information when generating a composite image, such as but not limited to the example composite image shown in FIG. 6D. The image assets identified in the image asset repository 170 in operation 638 can be positioned, scaled, and/or rotated when generating the image asset 697 from these image assets. Furthermore, some image assets may also comprise posable components, such as but not limited to a hand with posable fingers. The image asset customization unit 206 can select a pose for such posable image assets that satisfies the request from the user prompt and/or best matches with the sample image 635.

The image asset customization unit 206 can seek authorization from an administrator before adding the new image to the image asset repository 170. Furthermore, the image asset customization unit 206 can determine whether the user has provided any positive or negative feedback in response to presenting the representation 641 of the image asset 697 on the user interface 600. The negative feedback may include one or more subsequent prompts requesting that the image generation system further refine the image asset.

Figure 6E:
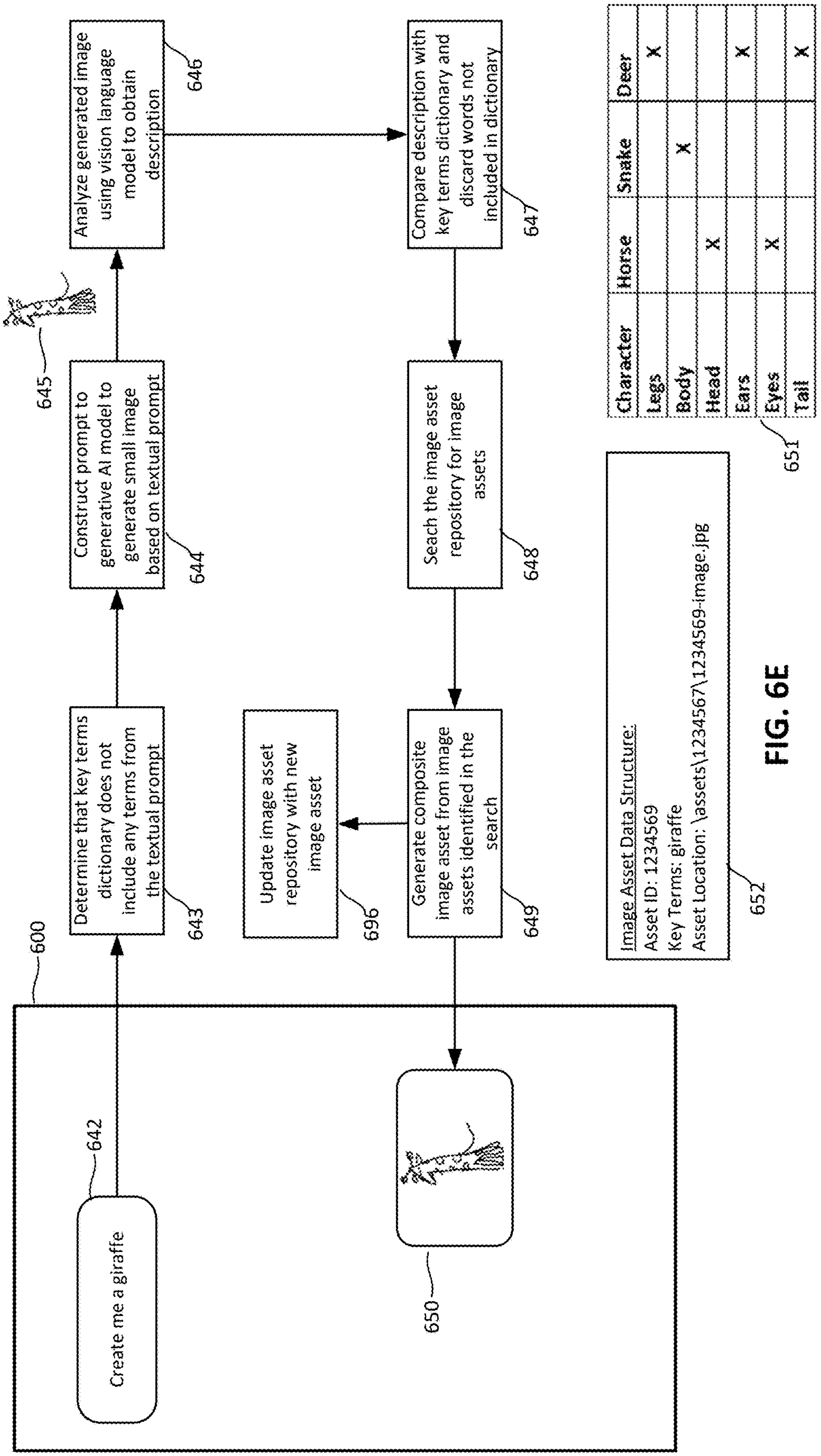

FIG. 6E provides another example of user interactions with the image generation system that utilizes the implementation of the repository-based content generation pipeline 162 shown in FIG. 4. In the example shown in FIG. 6E, the image asset search unit 204 determines that the image generation system includes prestored image content in the image asset repository 170 that satisfies the first threshold condition for providing prestored image assets from the image asset repository 170 in response to the prompt input by the user. The threshold condition is satisfied because the image asset repository 170 includes two or more image assets can be combined to generate a new image asset that satisfies all of the requirements of the first textual prompt even though there is not an exact match for the key terms in the image asset repository 170. In this example, the user inputs a textual prompt 642 requesting that the image generation system generate an image of a giraffe. In operation 643, the key terms extraction unit 202 of the repository-based content generation pipeline 162 analyzes the textual prompt 631 by comparing the textual prompt with the key terms of the key terms dictionary 172. In this example, the key terms dictionary 172 does not include the key term “giraffe” among the key terms included therein. In operation 644, the key terms extraction unit 202 constructs a prompt to the image generation model 182 instructing the image generation model 182 to generate an image based on the textual prompt that is no larger than a predetermined size limit. The key terms extraction unit 202 provides the prompt as an input to the image generation model 182, and the image generation model 182 generates and outputs the image 645. In operation 646, the key terms extraction unit 202 constructs a prompt to the vision language model 181 to generate a description of the attributes of the image 645 in a manner similar to that discussed with regard to FIG. 6D. In operation 647, the key terms extraction unit 202 analyzes the description of the image 635 to extract key terms from the description of the image 645. In operation 648, the image asset search unit 204 conducts a search for image assets in the image asset repository 170 based on the key terms that can be combined to generate an image that is at least an approximate representation of image requested in the textual prompt. The image assets 651 provide an example of the image assets returned by the search. In operation 649, the image asset customization unit 206 generates a composite image from the image assets identified by the key terms extraction unit 202. The query processing unit 132 provides the image asset to the request processing unit 120, and the request processing unit 120 provides an instance the image asset 652 to the application. The application then presents a representation 650 of the image asset 652 on the user interface 600.

The image asset customization unit 206 can also optionally add the new version of the image asset to the image asset repository 170 in operation 696. In this example, a new image asset 652 is created associated with the key term “giraffe” so that future textual prompts that include these key words can utilize this prestored image asset. The image asset customization unit 206 can seek authorization from an administrator before adding the new image to the image asset repository 170. Furthermore, the image asset customization unit 206 can determine whether the user has provided any positive or negative feedback in response to presenting the representation 650 of the image asset 652 on the user interface 600. The negative feedback may include one or more subsequent prompts requesting that the image generation system further refine the image asset.

Figure 6F:
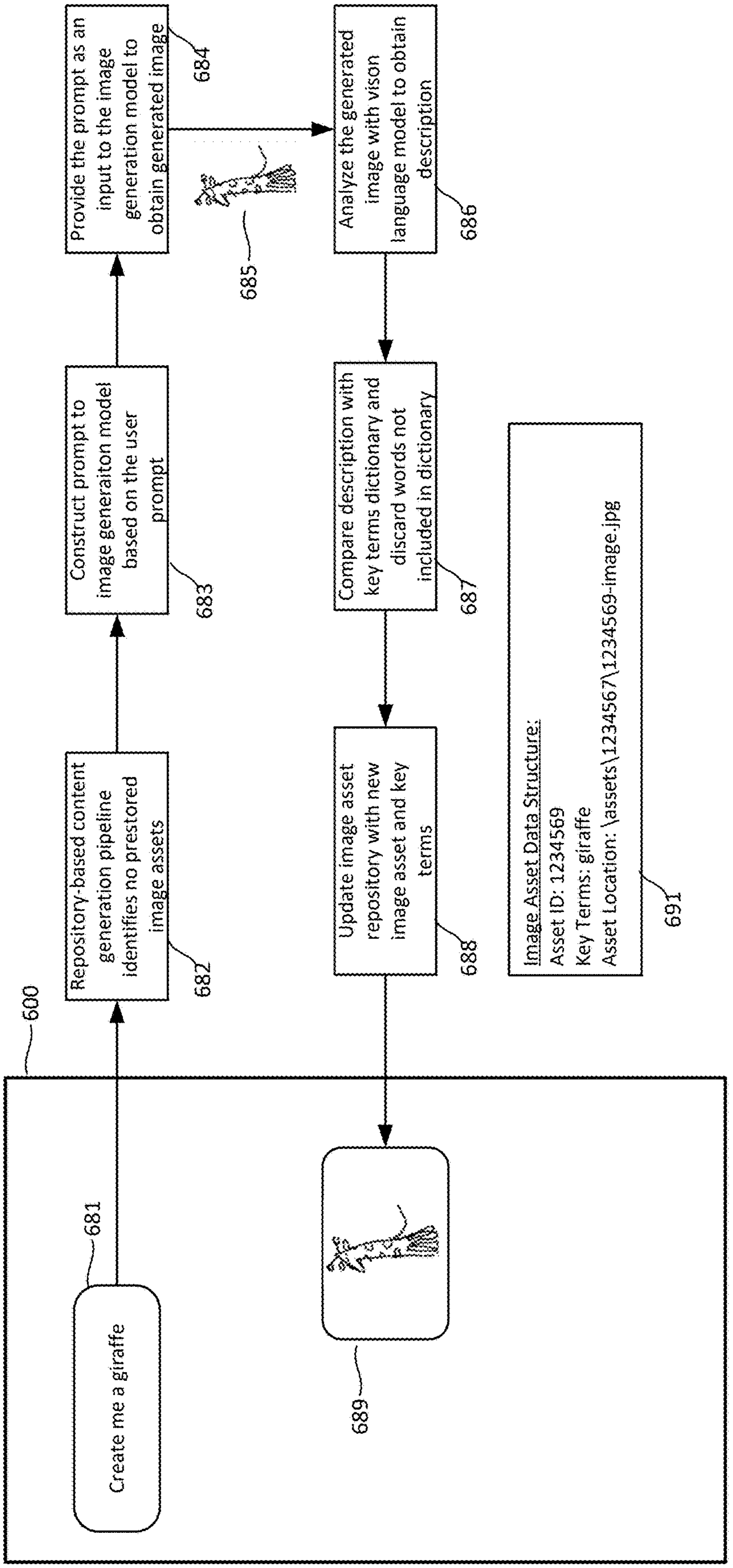

FIG. 6F provides another example of user interactions with the image generation system that utilizes the implementation of the AI-based content generation pipeline 164 shown in FIG. 5. In the example shown in FIG. 6F, the image asset search unit 204 determines that the image generation system does not include prestored image content in the image asset repository 170 that satisfies the first threshold condition for providing the requested image content corresponding to the textual prompt from prestored image assets in the image asset repository 170 or the second threshold condition for providing the requested image content using the hybrid generation mode. In operation 682, the repository-based content generation pipeline 162 is unable to identify any prestored image assets that will satisfy the user prompt 681. In operation 683, the prompt construction unit 502 of the AI-based content generation pipeline 164 constructs a prompt for the image generation model 182 based on the textual prompt input by the user. In operation 684, the prompt submission unit 504 provides the prompt constructed by the prompt construction unit 502 as an input to the image generation model 182 and obtains the generated image asset 685 from as an output of the image generation model 182. In operation 686, the key terms analysis unit 506 constructs a prompt to the vision language model 181 instructing the vision language model 181 to generate a description of the generated image asset 685. In operation 687, the key terms analysis unit then compares the description with the key terms dictionary 172 to extract key terms from the description. The generated image asset 685 and the key terms extracted from the description are provided as an input to the content processing unit 508. The content processing unit 508 updates the image asset repository 170 to include a new image asset 691 that represents the generated image asset 685 in operation 688.

The query processing unit 132 provides the generated image asset 685 to the request processing unit 120, and the request processing unit 120 provides the generated image asset 685 to the application from which the user input the textual prompt. The application then presents a representation 689 of the image asset 685 on the user interface 600.

The content processing unit 508 can seek authorization from an administrator before adding the new image to the image asset repository 170. Furthermore, the content processing unit 508 can determine whether the user has provided any positive or negative feedback in response to presenting the representation 689 of the image asset 685 on the user interface 600. The negative feedback may include one or more subsequent prompts requesting that the image generation system further refine the image asset.

While the example shown in FIG. 6F generates an image in response to a textual prompt from the user, the image generation system could also receive both textual prompt and an image prompt. The textual prompt may not always specify what the user would like to create and instead relies on the image prompt. For instance, the textual prompt might state “create me a design like this” and provide an image of a giraffe as an input. The key terms extraction unit 202 provides the image prompt to the vision language model 181 as shown in FIG. 4 to obtain a description of the image prompt. This description is then analyzed for key terms by the key terms extraction unit 202. The process can then continue with operation 682 as discussed above.

Figure 6G:
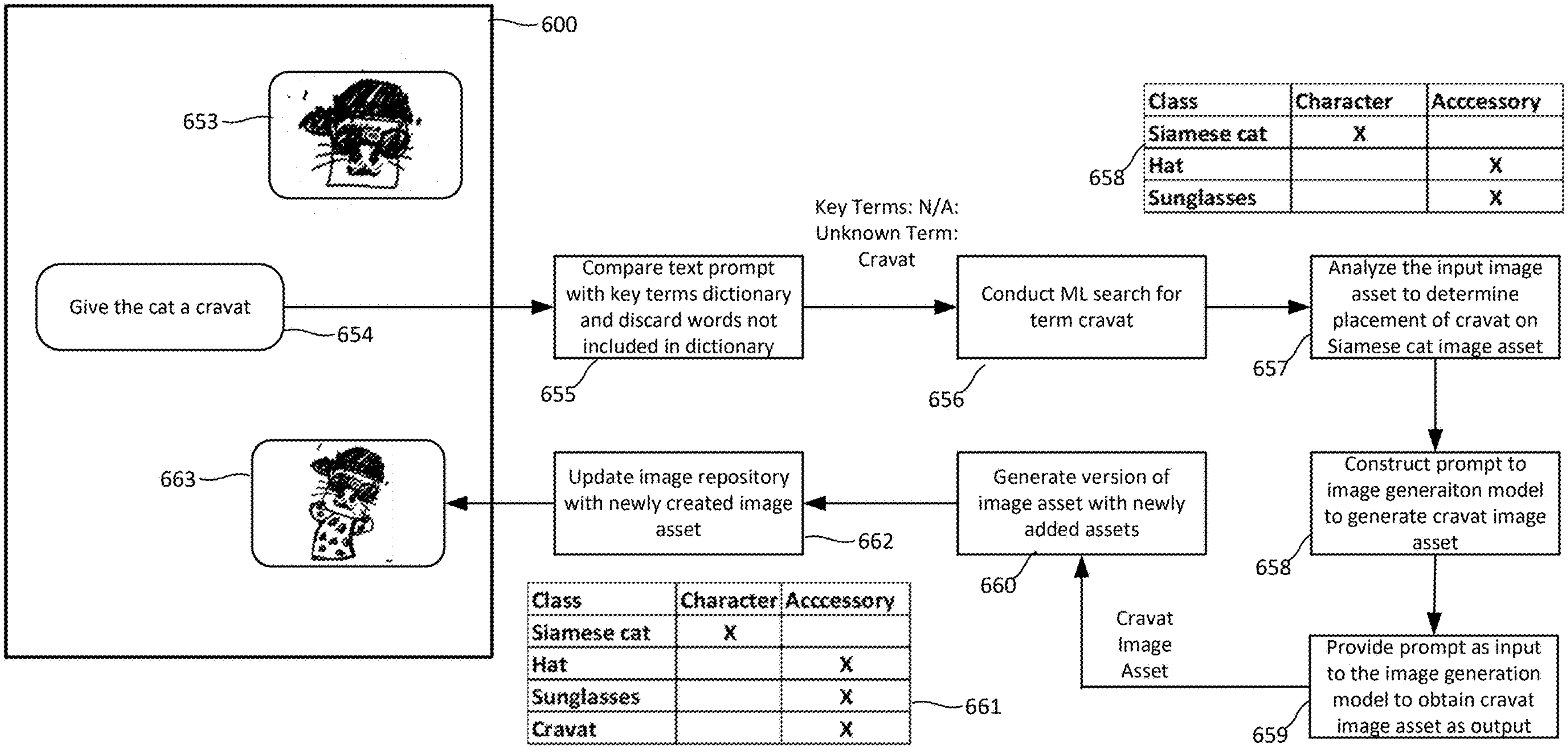

FIG. 6G provides another example of user interactions with the image generation system that utilizes the implementation of the repository-based content generation pipeline 162 shown in FIG. 4. FIG. 6G shows and example of the repository-based content generation pipeline 162 operating in the hybrid generation mode. In the example shown in FIG. 6G, the image asset search unit 204 determines that the image generation system does not include prestored providing the requested image content corresponding to the textual prompt from prestored image assets in the image asset repository 170 based on content from the image asset repository 170, but the image asset repository 170 does include prestored image content that satisfies the second condition for providing the requested image content using the hybrid generation mode. A technical benefit of this approach is that the computational, energy, and water costs associated with providing an image generation system can be significantly reduced when operating the image generation system in the hybrid generation model by utilizing prestored image assets to generate all or part of the requested image content. The example shown in FIG. 6G continues with the user session shown in FIG. 6C in which the user prompted the image generation system to revise an image of a cat to include a hat and sunglasses. A representation of the cat 653 is shown in the user interface 600. The user then enters a prompt 654 that requests that the image generation system add a cravat to the image of the cat. In operation 655, The key terms extraction unit 202 of the repository-based content generation pipeline 162 determines that the term "cravat" is not included in the key terms dictionary 172. The key terms extraction unit 202 provides the key term to the image asset search unit 204 with an indication that the key term cravat was not found in the key terms dictionary 172. Since the key terms dictionary 172 includes all of the key terms that can be mapped to image assets in the image asset repository 170, the image asset repository 170 will not currently include a prestored image asset of a cravat. In operation 656, the image asset search unit 204 can optionally conduct a machine learning driven search for image assets from publicly available and/or privately available images that show a cravat. The image assets 658 provide an example of the image assets associated with the Siamese cat image asset shown in the representation of the cat 653. In some implementations, the image asset search unit 204 constructs a query to a search engine (not shown) that may be implemented on the application services platform 110 or on another cloud-based service platform (not shown). In operation 657, the image asset search unit 204 provides one or more sample images obtained from the search to the image asset customization unit 206, and the image asset customization unit 206 constructs a prompt to the vision language model 181 to analyze the one or more sample images and to output a description of the sample cravat images. The description can be used to determine where the cravat image asset should be placed on the image of the cat. For instance, the description of the cravat may indicate that the cravat is an article of clothing worn around the neck. The image asset customization unit 206 constructs a prompt to the image generation model 182 to cause the image generation model 182 to generate a new cravat image asset, and in operation 659 provides the prompt as an input to the image generation model 182 to cause the image generation model 182 to output the cravat image asset. The image asset customization unit 206 can use this information to determine where to place the cravat image asset when generating the new image asset by compositing the cravat image asset with the Siamese cat, hat, and sunglasses image assets in operation 660. In operation 662, the image asset customization unit 206 adds the cravat image asset and the new composite image of the cat wearing the cravat to the image asset repository 170. The updated image assets 661 include the new cravat asset. The image asset customization unit 206 can also update the key terms dictionary 172 to include the new term "cravat" so that future requests for image content can utilize the newly created image assets.

The query processing unit 132 provides the generated image asset 661 to the request processing unit 120, and the request processing unit 120 provides the generated image asset 661 to the application from which the user input the textual prompt. The application then presents a representation 663 of the image asset 661 on the user interface 600.

The image asset customization unit 206 can seek authorization from an administrator before adding the new images to the image asset repository 170. Furthermore, the image asset customization unit 206 can determine whether the user has provided any positive or negative feedback in response to presenting the representation 663 of the image asset 661 on the user interface 600. The negative feedback may include one or more subsequent prompts requesting that the image generation system further refine the image asset.

Figure 7A:
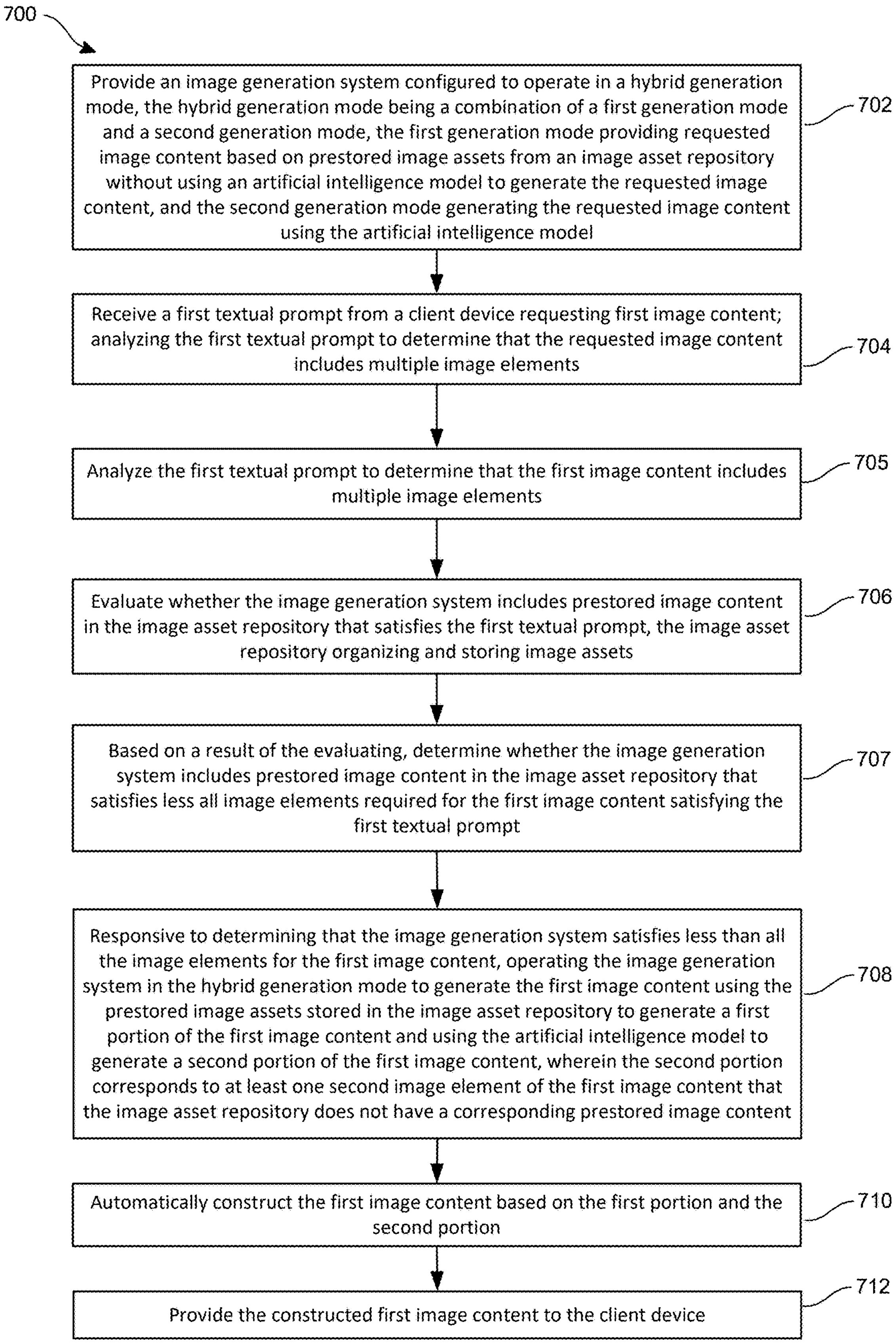
FIG. 7A is a flow chart of an example process for providing image contents in response to a user prompt according to the techniques disclosed herein.

FIG. 7A is a flow chart of an example process 700 for providing image contents in response to a user prompt according to the techniques disclosed herein. The process 700 can be implemented by the query processing unit 132 shown in FIGS. 1A and 1B.

The process 700 includes an operation 702 of providing an image generation system configured to operate in a hybrid generation mode, the hybrid generation mode being a combination of a first generation mode and a second generation mode, the first generation mode providing requested image content based on prestored image assets from an image asset repository without using an artificial intelligence model to generate the requested image content, and the second generation mode generating the requested image content using the artificial intelligence model. The artificial intelligence model is a generative artificial intelligence model that generates and outputs new image content in response to a natural language prompt, such as the image generation model 182. The image generation system can be implemented by the application services platform 110 shown in FIG. 1A. The first generation mode can be implemented by the repository-based content generation pipeline 162, and the second generation mode can be implemented by the AI-based content generation pipeline 164. The hybrid mode can be implemented using the repository-based content generation pipeline 162 in some implementations. The hybrid mode can be implemented using both the repository-based content generation pipeline 162 and the AI-based content generation pipeline 164 in other implementations. A technical benefit of this approach is that the computational, energy, and water costs associated with providing an image generation system can be significantly reduced when operating the image generation system in the hybrid generation model by utilizing prestored image assets to generate all or part of the requested image content.

The process 700 includes an operation 704 of receiving a first textual prompt from a client device requesting first image content and an operation 705 of analyzing the first textual prompt to determine that the first image content includes multiple image elements. The first textual prompt can be received from an application, such as the native application 114 on the client device 105 or the web application 190 implemented on the application services platform 110. The application can provide a user interface that enables the user to interact with the image generation system to prompt the system to generate image content. The user can also prompt the image generation system further customize image contents generated by the image generation system. The repository-based content generation pipeline 162 analyzes the first textual prompt to determine that the requested image content includes multiple image elements.

The process 700 includes an operation 706 of evaluating whether the image generation system includes prestored image content in the image asset repository that satisfies the first textual prompt. The image asset repository 170 organizes and stores image assets as discussed in the preceding examples. The repository-based content generation pipeline 162 evaluates whether the image generation system includes prestored image content in the image asset repository that satisfies the first textual prompt.

The process 700 includes an operation 707 of, based on a result of the evaluating, determining whether the image generation system includes prestored image content in the image asset repository that satisfies less than all image elements required for the first image content satisfying the first textual prompt. The repository-based content generation pipeline 162 determines that the image asset repository 170 does not include all of the image elements needed to generate the requested content and at least a portion of these image elements will need to be generated using the image generation model 182.

The process 700 includes an operation 708 of responsive to d determining that the image generation system satisfies less than all the image elements for the first image content, operating the image generation system in the hybrid generation mode to generate the first image content using the prestored image assets stored in the image asset repository to generate a first portion of the first image content and using the artificial intelligence model to generate a second portion of the first image content. The second portion corresponds to at least one second image element of the first image content that the image asset repository does not have a corresponding prestored image content. The repository-based content generation pipeline 162 can operate in the hybrid mode to generate the generate the first image content utilizing the prestored image assets from the image asset repository 170. The second portion of the image can be generated by operating the repository-based content generation pipeline 162 in the hybrid mode and/or by operating the AI-based content generation pipeline 164.

The process 700 includes an operation 710 of automatically constructing the first image content based on the first portion and the second portion. The repository-based content generation pipeline 162 constructs the first image content by combining the first portion of the image content generated by the repository-based content generation pipeline 162 using the prestored image assets with the second image portion of the image content that was generated using the vision language model and/or other AI models.

The process 700 includes an operation 712 of providing the constructed first image content to the client device. The query processing unit 132 can output the first image content that has been generated by the repository-based content generation pipeline 162 and/or the AI-based content generation pipeline 164, and the request processing unit 120 provides the first image content to the web application 190 which is accessed via the browser application 112 of the client device 105 or the native application 114.

Figure 7B:
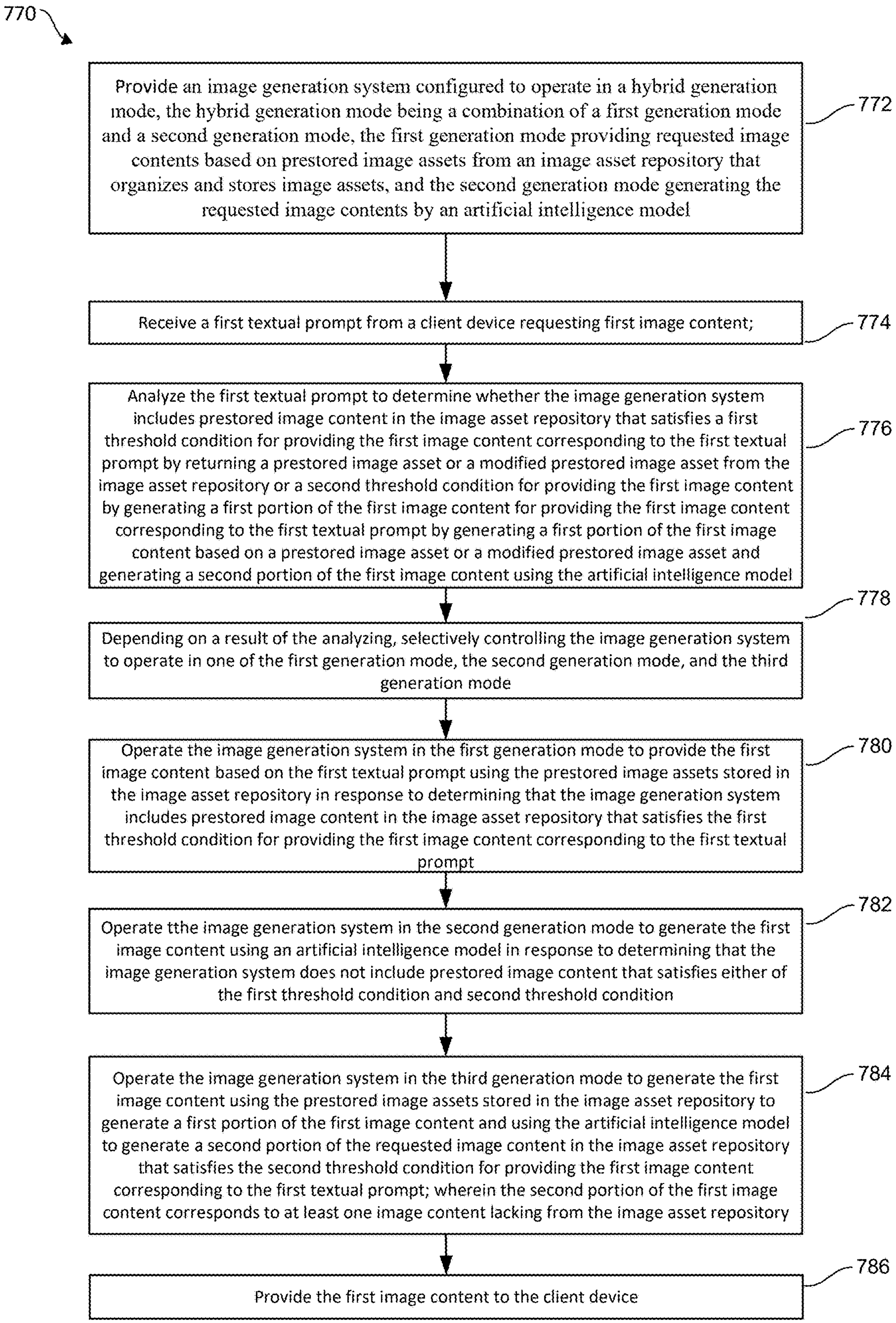
FIG. 7B is a flow chart of an example process for providing image contents in response to a user prompt according to the techniques disclosed herein.

FIG. 7B is a flow chart of another example process 770 for providing image contents in response to a user prompt according to the techniques disclosed herein. The process 770 can be implemented by the query processing unit 132 shown in FIGS. 1A and 1B.

The process 700 includes an operation 772 of providing an image generation system configured to operate in a first generation mode, a second generation mode, and a third generation mode. The first generation mode provides requested image content based on prestored image assets from an image asset repository without using an artificial intelligence model to generate the requested image content. The second generation mode generates the requested image content using the artificial intelligence model. The third generation mode is a hybrid generation mode providing requested image content based on prestored images from the image asset repository and image content generated by an artificial intelligence model. The artificial intelligence model being a generative artificial intelligence model that generates and outputs new image content in response to a natural language prompt, such as the image generation model 182. The image generation system can be implemented by the application services platform 110 shown in FIG. 1A. The first generation mode can be implemented by the repository-based content generation pipeline 162, and the second generation mode can be implemented by the AI-based content generation pipeline 164. The hybrid mode can be implemented using the repository-based content generation pipeline 162 in some implementations. The hybrid mode can be implemented using both the repository-based content generation pipeline 162 and the AI-based content generation pipeline 164 in other implementations. A technical benefit of this approach is that the computational, energy, and water costs associated with providing an image generation system can be significantly reduced when operating the image generation system in the first generation mode and/or the hybrid generation model by utilizing prestored image assets to generate all or part of the requested image content.

The process 700 includes an operation 774 of receiving a first textual prompt from a client device requesting first image content. The first textual prompt can be received from an application, such as the native application 114 on the client device 105 or the web application 190 implemented on the application services platform 110. The application can provide a user interface that enables the user to interact with the image generation system to prompt the system to generate image content. The user can also prompt the image generation system further customize image contents generated by the image generation system.

The process 700 includes an operation 776 of analyzing the first textual prompt to determine whether the image generation system includes prestored image content in the image asset repository that satisfies the first textual prompt. The image asset repository 170 organizes and stores image assets as discussed in the preceding examples. The repository-based content generation pipeline 162 analyzes the first textual prompt to make this determination.

The process 700 includes an operation 778 of depending on a result of the analyzing, selectively controlling the image generation system to operate in one of the first generation mode, the second generation mode, and the third generation mode. The repository-based content generation pipeline 162 determines which operating mode is appropriate for providing the content requested by the user.

The process 700 includes an operation 780 of operating the image generation system in the first generation mode to provide the first image content based on the first textual prompt using the prestored image assets stored in the image asset repository in response to determining that the image generation system includes prestored image content in the image asset repository that satisfies the first textual prompt. The repository-based content generation pipeline 162 determines whether the image asset repository 170 includes image assets that can be used to satisfy the first textual prompt and generates the requested content using image assets from the image asset repository 170 if such assets are available. As discussed in the preceding examples, the repository-based content generation pipeline 162 can customize the image assets obtained from the image asset repository 170.

The process 700 includes an operation 782 of operating the image generation system in the second generation mode to generate the first image content using an artificial intelligence model in response to determining that the image generation system does not include prestored image content in the image asset repository that satisfies the first textual prompt. The AI model can be implemented by the image generation model 182. The AI-based content generation pipeline 164 can use the image generation model 182 to generate the requested image content in instance in which the image asset repository does not include image assets that satisfy the first textual prompt.

The process 700 includes an operation 784 of operating the image generation system in the third generation mode to generate the first image content using the prestored image assets stored in the image asset repository to generate a first portion of the first image content and using the artificial intelligence model to generate a second portion of the requested image content in response to determining that the image generation system includes less than all prestored image content in the image asset repository that satisfies the first textual prompt. The second portion of the first image content corresponds to at least one image content lacking from the image asset repository The process 700 includes an operation 786 of providing the first image content to the client device. The query processing unit 132 can output the first image content that has been generated by the repository-based content generation pipeline 162 or the AI-based content generation pipeline 164, and the request processing unit 120 provides the first image content to the web application 190 which is accessed via the browser application 112 of the client device 105 or the native application 114.

The detailed examples of systems, devices, and techniques described in connection with FIGS. 1A-7B are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1A-7B are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 8:
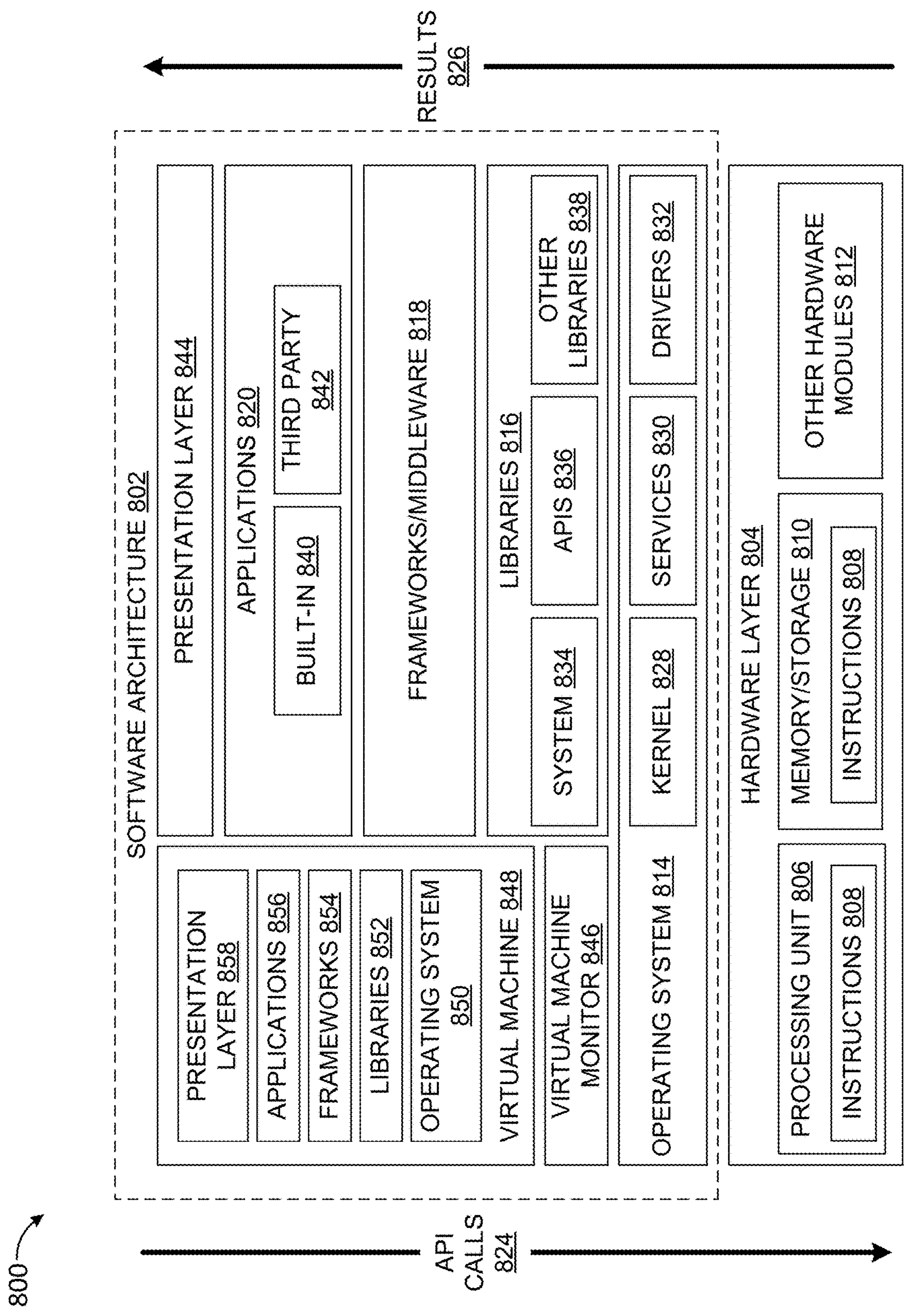
FIG. 8 is a block diagram showing an example software architecture, various portions of which may be used in conjunction with various hardware architectures herein described, which may implement any of the described features.

FIG. 8 is a block diagram 800 illustrating an example software architecture 802, various portions of which may be used in conjunction with various hardware architectures herein described, which may implement any of the above-described features. FIG. 8 is a non-limiting example of a software architecture, and it will be appreciated that many other architectures may be implemented to facilitate the functionality described herein. The software architecture 802 may execute on hardware such as a machine 900 of FIG. 9 that includes, among other things, processors 910, memory/storage, and input/output (I/O) components 950. A representative hardware layer 804 is illustrated and can represent, for example, the machine 900 of FIG. 9. The representative hardware layer 804 includes a processing unit 806 and associated executable instructions 808. The executable instructions 808 represent executable instructions of the software architecture 802, including implementation of the methods, modules and so forth described herein. The hardware layer 804 also includes a memory/storage 810, which also includes the executable instructions 808 and accompanying data. The hardware layer 804 may also include other hardware modules 812. Instructions 808 held by processing unit 806 may be portions of instructions 808 held by the memory/storage 810.

The example software architecture 802 may be conceptualized as layers, each providing various functionality. For example, the software architecture 802 may include layers and components such as an operating system (OS) 814, libraries 816, frameworks/middleware 818, applications 820, and a presentation layer 844. Operationally, the applications 820 and/or other components within the layers may invoke API calls 824 to other layers and receive corresponding results 826. The layers illustrated are representative in nature and other software architectures may include additional or different layers. For example, some mobile or special purpose operating systems may not provide the frameworks/middleware 818.

The OS 814 may manage hardware resources and provide common services. The OS 814 may include, for example, a kernel 828, services 830, and drivers 832. The kernel 828 may act as an abstraction layer between the hardware layer 804 and other software layers. For example, the kernel 828 may be responsible for memory management, processor management (for example, scheduling), component management, networking, security settings, and so on. The services 830 may provide other common services for the other software layers. The drivers 832 may be responsible for controlling or interfacing with the underlying hardware layer 804. For instance, the drivers 832 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 816 may provide a common infrastructure that may be used by the applications 820 and/or other components and/or layers. The libraries 816 typically provide functionality for use by other software modules to perform tasks, rather than interacting directly with the OS 814. The libraries 816 may include system libraries 834 (for example, C standard library) that may provide functions such as memory allocation, string manipulation, file operations. In addition, the libraries 816 may include API libraries 836 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 816 may also include a wide variety of other libraries 838 to provide many functions for applications 820 and other software modules.

The frameworks/middleware 818 provide a higher-level common infrastructure that may be used by the applications 820 and/or other software modules. For example, the frameworks/middleware 818 may provide various graphic user interface (GUI) functions, high-level resource management, or high-level location services. The frameworks/middleware 818 may provide a broad spectrum of other APIs for applications 820 and/or other software modules.

The applications 820 include built-in applications 840 and/or third-party applications 842. Examples of built-in applications 840 may include, but are not limited to, a contacts application, a browser application, a location application, a media application, a messaging application, and/or a game application. Third-party applications 842 may include any applications developed by an entity other than the vendor of the particular platform. The applications 820 may use functions available via OS 814, libraries 816, frameworks/middleware 818, and presentation layer 844 to create user interfaces to interact with users.

Some software architectures use virtual machines, as illustrated by a virtual machine 848. The virtual machine 848 provides an execution environment where applications/modules can execute as if they were executing on a hardware machine (such as the machine 900 of FIG. 9, for example). The virtual machine 848 may be hosted by a host OS (for example, OS 814) or hypervisor, and may have a virtual machine monitor 846 which manages operation of the virtual machine 848 and interoperation with the host operating system. A software architecture, which may be different from software architecture 802 outside of the virtual machine, executes within the virtual machine 848 such as an OS 850, libraries 852, frameworks 854, applications 856, and/or a presentation layer 858.

Figure 9:
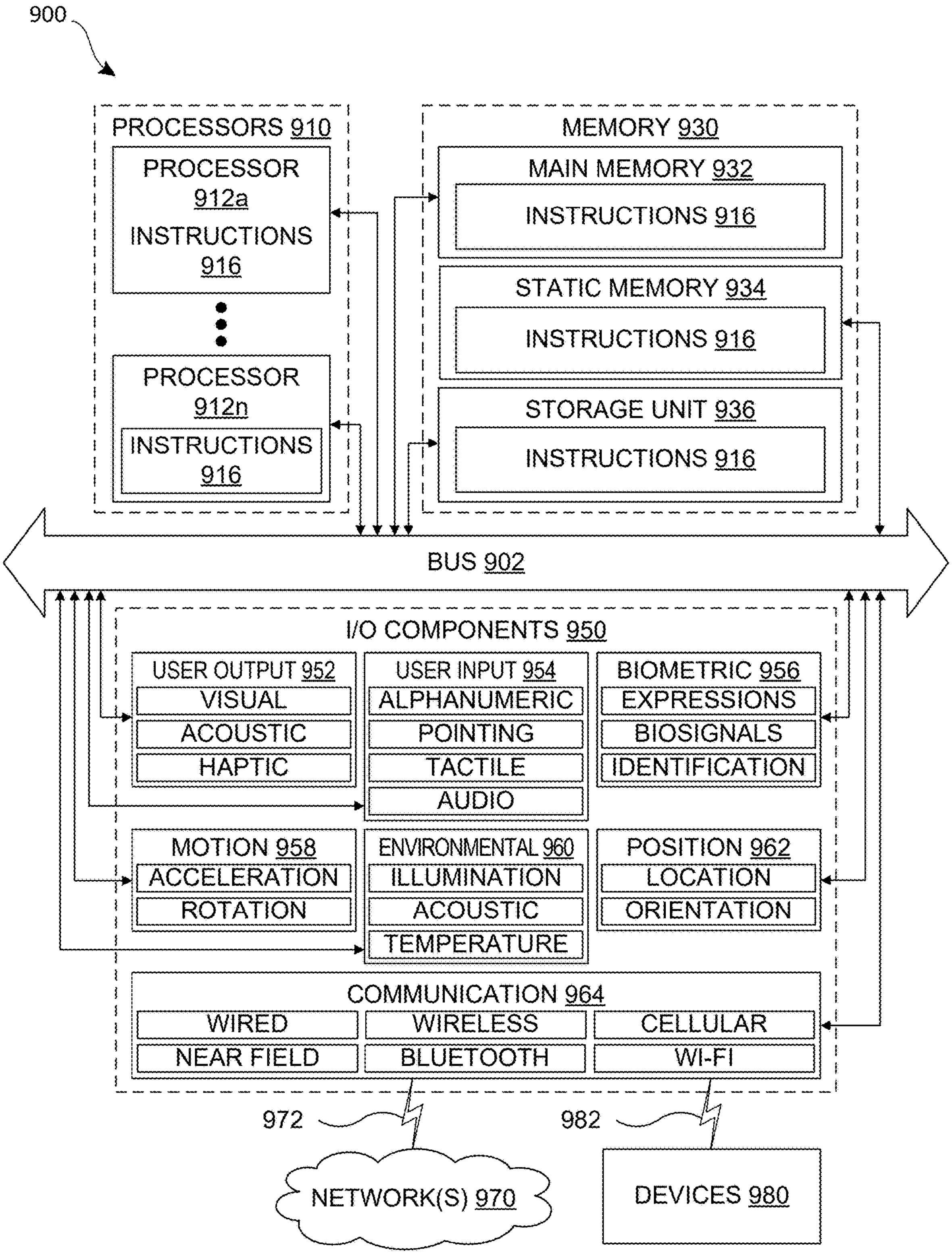
FIG. 9 is a block diagram showing components of an example machine configured to read instructions from a machine-readable medium and perform any of the features described herein.

FIG. 9 is a block diagram illustrating components of an example machine 900 configured to read instructions from a machine-readable medium (for example, a machine-readable storage medium) and perform any of the features described herein. The example machine 900 is in a form of a computer system, within which instructions 916 (for example, in the form of software components) for causing the machine 900 to perform any of the features described herein may be executed. As such, the instructions 916 may be used to implement modules or components described herein. The instructions 916 cause unprogrammed and/or unconfigured machine 900 to operate as a particular machine configured to carry out the described features. The machine 900 may be configured to operate as a standalone device or may be coupled (for example, networked) to other machines. In a networked deployment, the machine 900 may operate in the capacity of a server machine or a client machine in a server-client network environment, or as a node in a peer-to-peer or distributed network environment. Machine 900 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 900 is illustrated, the term "machine" includes a collection of machines that individually or jointly execute the instructions 916.

The machine 900 may include processors 910, memory/storage 930, and I/O components 950, which may be communicatively coupled via, for example, a bus 902. The bus 902 may include multiple buses coupling various elements of machine 900 via various bus technologies and protocols. In an example, the processors 910 (including, for example, a central processing unit (CPU), a graphics processing unit (GPU), a digital signal processor (DSP), an ASIC, or a suitable combination thereof) may include one or more processors 912*a* to 912*n* that may execute the instructions 916 and process data. In some examples, one or more processors 910 may execute instructions provided or identified by one or more other processors 910. The term “processor” includes a multicore processor including cores that may execute instructions contemporaneously. Although FIG. 9 shows multiple processors, the machine 900 may include a single processor with a single core, a single processor with multiple cores (for example, a multicore processor), multiple processors each with a single core, multiple processors each with multiple cores, or any combination thereof. In some examples, the machine 900 may include multiple processors distributed among multiple machines.

The memory/storage 930 may include a main memory 932, a static memory 934, or other memory, and a storage unit 936, both accessible to the processors 910 such as via the bus 902. The storage unit 936 and memory 932, 934 store instructions 916 embodying any one or more of the functions described herein. The memory/storage 930 may also store temporary, intermediate, and/or long-term data for processors 910. The instructions 916 may also reside, completely or partially, within the memory 932, 934, within the storage unit 936, within at least one of the processors 910 (for example, within a command buffer or cache memory), within memory at least one of I/O components 950, or any suitable combination thereof, during execution thereof. Accordingly, the memory 932, 934, the storage unit 936, memory in processors 910, and memory in I/O components 950 are examples of machine-readable media.

As used herein, “machine-readable medium” refers to a device able to temporarily or permanently store instructions and data that cause machine 900 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term “machine-readable medium” applies to a single medium, or combination of multiple media, used to store instructions (for example, instructions 916) for execution by a machine 900 such that the instructions, when executed by one or more processors 910 of the machine 900, cause the machine 900 to perform and one or more of the features described herein. Accordingly, a “machine-readable medium” may refer to a single storage device, as well as “cloud-based” storage systems or storage networks that include multiple storage apparatus or devices. The term “machine-readable medium” excludes signals per se.

The I/O components 950 may include a wide variety of hardware components adapted to receive input, provide output, produce output, transmit information, exchange information, capture measurements, and so on. The specific I/O components 950 included in a particular machine will depend on the type and/or function of the machine. For example, mobile devices such as mobile phones may include a touch input device, whereas a headless server or IoT device may not include such a touch input device. The particular examples of I/O components illustrated in FIG. 9 are in no way limiting, and other types of components may be included in machine 900. The grouping of I/O components 950 are merely for simplifying this discussion, and the grouping is in no way limiting. In various examples, the I/O components 950 may include user output components 952 and user input components 954. User output components 952 may include, for example, display components for displaying information (for example, a liquid crystal display (LCD) or a projector), acoustic components (for example, speakers), haptic components (for example, a vibratory motor or force-feedback device), and/or other signal generators. User input components 954 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 950 may include biometric components 956, motion components 958, environmental components 960, and/or position components 962, among a wide array of other physical sensor components. The biometric components 956 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 958 may include, for example, acceleration sensors (for example, an accelerometer) and rotation sensors (for example, a gyroscope). The environmental components 960 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 962 may include, for example, location sensors (for example, a Global Position System (GPS) receiver), altitude sensors (for example, an air pressure sensor from which altitude may be derived), and/or orientation sensors (for example, magnetometers).

The I/O components 950 may include communication components 964, implementing a wide variety of technologies operable to couple the machine 900 to network(s) 970 and/or device(s) 980 via respective communicative couplings 972 and 982. The communication components 964 may include one or more network interface components or other suitable devices to interface with the network(s) 970. The communication components 964 may include, for example, components adapted to provide wired communication, wireless communication, cellular communication, Near Field Communication (NFC), Bluetooth communication, Wi-Fi, and/or communication via other modalities. The device(s) 980 may include other machines or various peripheral devices (for example, coupled via USB).

In some examples, the communication components 964 may detect identifiers or include components adapted to detect identifiers. For example, the communication components 964 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 964, such as, but not limited to, geo-location via Internet Protocol (IP) address, location via Wi-Fi, cellular, NFC, Bluetooth, or other wireless station identification and/or signal triangulation.

In the preceding detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high level, without detail, in order to avoid unnecessarily obscuring aspects of the present teachings.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article, or apparatus are capable of performing all of the recited functions.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:

a processor; and a memory storing executable instructions that, when executed, cause the processor alone or in combination with other processors to perform operations of:

providing an image generation system configured to operate in a hybrid generation mode, the hybrid generation mode being a combination of a first generation mode and a second generation mode, the first generation mode providing requested image contents based on prestored image assets from an image asset repository that organizes and stores image assets, and the second generation mode generating the requested image contents by an artificial intelligence model;

receiving a first textual prompt from a client device requesting first image content;

analyzing the first textual prompt to determine that the first image content includes multiple image elements;

evaluating whether the image generation system includes prestored image content in the image asset repository that satisfies the first textual prompt, the image asset repository organizing and storing image assets;

based on a result of the evaluating, determining whether the image generation system includes prestored image content in the image asset repository that satisfies less than all image elements required for the first image content satisfying the first textual prompt;

responsive to determining that the image generation system satisfies less than all the image elements for the first image content, operating the image generation system in the hybrid generation mode to generate the first image content using the prestored image assets stored in the image asset repository to generate a first portion of the first image content and using the artificial intelligence model to generate a second portion of the first image content, wherein the second portion corresponds to at least one second image element of the first image content that the image asset repository does not have a corresponding prestored image content;

automatically constructing the first image content based on the first portion and the second portion; and providing the constructed first image content to the client device.

2. The data processing system of claim 1, wherein to operate the image generation system in the hybrid generation mode, the memory further includes instructions that, when executed, cause the processor alone or in combination with other processors to perform operations of:

obtaining one or more first image assets from the image asset repository to be used to generate the first portion of the first image content;

constructing a prompt to the artificial intelligence model based on the first textual prompt to generate the second portion of the first image content; and providing the prompt as an input to the artificial intelligence model to cause the artificial intelligence model to generate the second portion of the first image content.

3. The data processing system of claim 1, wherein to analyze the first textual prompt to determine whether the image generation system includes prestored image content in the image asset repository that satisfies the first textual prompt, the memory further includes instructions that, when executed, cause the processor alone or in combination with other processors to perform operations of:

analyzing the first textual prompt for the first image content using a fixed dictionary of terms to extract first key terms from the first textual prompt; and conducting a first search in the image asset repository using the first key terms to obtain one or more first image assets, the image asset repository including a plurality of image assets, each image asset is associated with one or more terms of the fixed dictionary of terms and one or more tokens, the one or more tokens being image components associated with a respective image asset being combinable in various combinations to create different versions of the respective image asset.

4. The data processing system of claim 3, wherein the memory further stores executable instructions that, when executed, cause the processor alone or in combination with other processors to perform operations of:

receiving a second textual prompt from the client device requesting changes to the first image content;

analyzing the second textual prompt to determine whether the image asset repository includes prestored image content in the image asset repository that satisfies the second textual prompt;

in response to determining that image generation system includes prestored image content in the image asset repository that satisfies the second textual prompt, generating an updated image content from the first image content using the prestored image content in the image asset repository; and providing the updated image content to the client device.

5. The data processing system of claim 4, wherein to analyze the second textual prompt to determine whether the image asset repository includes prestored image content, the memory further includes instructions that, when executed, cause the processor alone or in combination with other processors to perform operations of:

analyzing the second textual prompt using the fixed dictionary to extract second key terms;

conducting a second search in the image asset repository using the second key terms to obtain one or more third image assets;

combining the one or more third image assets with the first image content to generate updated image content; and providing the updated image content to the client device.

6. The data processing system of claim 4, wherein the memory further stores executable instructions that, when executed, cause the processor alone or in combination with other processors to perform operations of:

analyzing the second textual prompt using the fixed dictionary to extract second key terms;

customizing one or more attributes associated with the first image content to generate a customized image asset based on the second key terms; and providing the customized image asset to the client device.

7. The data processing system of claim 3, wherein the memory further stores executable instructions that, when executed, cause the processor alone or in combination with other processors to perform operations of:

receiving a second textual prompt from the client device requesting changes to the first image content;

analyzing the second textual prompt to determine whether the image generation system includes prestored image content in the image asset repository that satisfies the second textual prompt; and in response to determining that image generation system does not include prestored image content in the image asset repository that satisfies the second textual prompt, constructing a second prompt to the artificial intelligence model to generate one or more third image assets, providing the second prompt as an input to the artificial intelligence model to cause the artificial intelligence model to output the one or more third image assets;

combining the one or more third image assets with the first image content to generate updated image content, and providing the updated image content to the client device.

8. The data processing system of claim 6, wherein to customize the one or more attributes of the first image content, the memory further stores executable instructions that, when executed, cause the processor alone or in combination with other processors to perform operations of:

determining that the image asset repository does not include any tokens associated with the first image content that satisfy the second textual prompt to modify the one or more attributes of the first image content;

constructing a prompt to an image generation model to generate one or more new tokens based on the second textual prompt to modify the one or more attributes of the first image content;

providing the prompt as an input to the image generation model to obtain the one or more new tokens; and generating the customized image asset from the first image content by combining the first image content with the one or more new tokens.

9. The data processing system of claim 3, wherein the first textual prompt includes an example image, and wherein the memory further includes instructions that, when executed, cause the processor alone or in combination with other processors to perform operations of:

analyzing the example image using a vision language model configured to output a description of the example image, wherein analyzing the first textual prompt for the first image content using the fixed dictionary of terms further comprises:

analyzing the description of the example image using the fixed dictionary of terms to extract additional key terms; and adding the additional key terms to the first key terms.

10. The data processing system of claim 5, wherein to conduct the first search in the image asset repository using the first key terms to identify a first image asset, the memory further stores executable instructions that, when executed, cause the processor alone or in combination with other processors to perform operations of:

determining that the image asset repository does not include any image assets that match the first key terms;

constructing a prompt to an image generation model instructing the image generation model to generate a generated image based on the first textual prompt that is no larger than a predetermined size limit;

providing the prompt as an input to the image generation model to obtain the generated image;

constructing a second prompt to a vision language model instructing the vision language model to generate a description of a subject of the generated image;

analyzing the description of the generated image using the fixed dictionary of terms to extract second key terms from the first textual prompt;

conducting a second search in the image asset repository using the second key terms to obtain second search results that include one or more image assets included in the image asset repository; and generating a new image asset based on the one or more image assets.

11. A machine-readable medium on which are stored instructions that, when executed, cause a processor of alone or in combination with other processors to perform operations of:

providing an image generation system configured to operate in a hybrid generation mode, the hybrid generation mode being a combination of a first generation mode and a second generation mode, the first generation mode providing requested image contents based on prestored image assets from an image asset repository that organizes and stores image assets, and the second generation mode generating the requested image contents by an artificial intelligence model;

receiving a first textual prompt from a client device requesting first image content;

analyzing the first textual prompt to determine that the first image content includes multiple image elements;

evaluating whether the image generation system includes prestored image content in the image asset repository that satisfies the first textual prompt, the image asset repository organizing and storing image assets;

based on a result of the evaluating, determining whether the image generation system includes prestored image content in the image asset repository that satisfies less than all image elements required for the first image content satisfying the first textual prompt;

responsive to determining that the image generation system satisfies less than all the image elements for the first image content, operating the image generation system in the hybrid generation mode to generate the first image content using the prestored image assets stored in the image asset repository to generate a first portion of the first image content and using the artificial intelligence model to generate a second portion of the first image content, wherein the second portion corresponds to at least one second image element of the first image content that the image asset repository does not have a corresponding prestored image content;

automatically constructing the first image content based on the first portion and the second portion; and providing the constructed first image content to the client device.

12. The machine-readable medium of claim 11, wherein to operate the image generation system in the hybrid generation mode, the machine-readable medium further includes instructions that, when executed, cause the processor alone or in combination with other processors to perform operations of:

obtaining one or more first image assets from the image asset repository to be used to generate the first portion of the first image content;

constructing a prompt to the artificial intelligence model based on the first textual prompt to generate the second portion of the first image content; and providing the prompt as an input to the artificial intelligence model to cause the artificial intelligence model to generate the second portion of the first image content.

13. The machine-readable medium of claim 11, wherein to analyze the first textual prompt to determine whether the image generation system includes prestored image content in the image asset repository that satisfies the first textual prompt, the machine-readable medium further includes instructions that, when executed, cause the processor alone or in combination with other processors to perform operations of:

analyzing the first textual prompt for the first image content using a fixed dictionary of terms to extract first key terms from the first textual prompt; and conducting a first search in the image asset repository using the first key terms to obtain one or more first image assets, the image asset repository including a plurality of image assets, each image asset is associated with one or more terms of the fixed dictionary of terms and one or more tokens, the one or more tokens being image components associated with a respective image asset being combinable in various combinations to create different versions of the respective image asset.

14. The machine-readable medium of claim 13, wherein the machine-readable medium further stores executable instructions that, when executed, cause the processor alone or in combination with other processors to perform operations of:

receiving a second textual prompt from the client device requesting changes to the first image content;

analyzing the second textual prompt to determine whether the image asset repository includes prestored image content in the image asset repository that satisfies the second textual prompt;

in response to determining that image generation system includes prestored image content in the image asset repository that satisfies the second textual prompt, generating an updated image content from the first image content using the prestored image content in the image asset repository; and providing the updated image content to the client device.

15. The machine-readable medium of claim 14, wherein to analyze the second textual prompt to determine whether the image asset repository includes prestored image content, the machine-readable medium further includes instructions that, when executed, cause the processor alone or in combination with other processors to perform operations of:

analyzing the second textual prompt using the fixed dictionary to extract second key terms;

conducting a second search in the image asset repository using the second key terms to obtain one or more third image assets;

combining the one or more third image assets with the first image content to generate updated image content; and providing the updated image content to the client device.

16. A method implemented in a data processing system for operating an image generation system, the method comprising:

providing an image generation system configured to operate in a hybrid generation mode, the hybrid generation mode being a combination of a first generation mode and a second generation mode, the first generation mode providing requested image contents based on prestored image assets from an image asset repository that organizes and stores image assets, and the second generation mode generating the requested image contents by an artificial intelligence model;

receiving a first textual prompt from a client device requesting first image content; analyzing the first textual prompt to determine that the first image content includes multiple image elements;

evaluating whether the image generation system includes prestored image content in the image asset repository that satisfies the first textual prompt, the image asset repository organizing and storing image assets;

based on a result of the evaluating, determining whether the image generation system includes prestored image content in the image asset repository that satisfies less than all image elements required for the first image content satisfying the first textual prompt;

responsive to determining that the image generation system lacks at least one of prestored image content in the image asset repository that satisfies at least one image element of the first image content requested by the first textual prompt, operating the image generation system in the hybrid generation mode to generate the first image content using the prestored image assets stored in the image asset repository to generate a first portion of the first image content and using the artificial intelligence model to generate a second portion of the first image content, wherein the second portion corresponds to at least one second image element of the first image content that the image asset repository does not have a corresponding prestored image content;

automatically constructing the first image content based on the first portion and the second portion; and providing the constructed first image content to the client device.

17. The method of claim 16, wherein operating the image generation system in the hybrid generation mode further comprises:

obtaining one or more first image assets from the image asset repository to be used to generate the first portion of the first image content;

constructing a prompt to the artificial intelligence model based on the first textual prompt to generate the second portion of the first image content; and providing the prompt as an input to the artificial intelligence model to cause the artificial intelligence model to generate the second portion of the first image content.

18. The method of claim 16, wherein analyzing the first textual prompt to determine whether the image generation system includes prestored image content in the image asset repository that satisfies the first textual prompt further comprises:

analyzing the first textual prompt for the first image content using a fixed dictionary of terms to extract first key terms from the first textual prompt; and conducting a first search in the image asset repository using the first key terms to obtain one or more first image assets, the image asset repository including a plurality of image assets, each image asset is associated with one or more terms of the fixed dictionary of terms and one or more tokens, the one or more tokens being image components associated with a respective image asset being combinable in various combinations to create different versions of the respective image asset.

19. The method of claim 18, further comprising:

receiving a second textual prompt from the client device requesting changes to the first image content;

analyzing the second textual prompt to determine whether the image asset repository includes prestored image content in the image asset repository that satisfies the second textual prompt;

in response to determining that image generation system includes prestored image content in the image asset repository that satisfies the second textual prompt, generating an updated image content from the first image content using the prestored image content in the image asset repository; and providing the updated image content to the client device.

20. The method of claim 19, wherein analyzing the second textual prompt to determine whether the image asset repository includes prestored image content further comprises:

analyzing the second textual prompt using the fixed dictionary to extract second key terms;

conducting a second search in the image asset repository using the second key terms to obtain one or more third image assets;

combining the one or more third image assets with the first image content to generate updated image content; and providing the updated image content to the client device.

* * * * *